(12) United States Patent
Ravanat

(10) Patent No.: US 11,844,341 B2
(45) Date of Patent: Dec. 19, 2023

(54) PRUNING ROBOT FOR REMOVING PROCESSIONARY CATERPILLAR NESTS

(71) Applicant: Jacques Ravanat, Saint-Ismier (FR)

(72) Inventor: Jacques Ravanat, Saint-Ismier (FR)

( * ) Notice: Subject to any disclaimer, the term of this patent is extended or adjusted under 35 U.S.C. 154(b) by 156 days.

(21) Appl. No.: 17/593,656

(22) PCT Filed: Mar. 16, 2020

(86) PCT No.: PCT/FR2020/050547
§ 371 (c)(1),
(2) Date: Sep. 22, 2021

(87) PCT Pub. No.: WO2020/193904
PCT Pub. Date: Oct. 1, 2020

(65) Prior Publication Data
US 2022/0174932 A1 Jun. 9, 2022

(30) Foreign Application Priority Data
Mar. 22, 2019 (FR) ........................... 1903028

(51) Int. Cl.
*A01M 5/02* (2006.01)
*A01G 3/08* (2006.01)
*B25J 11/00* (2006.01)
*B64C 39/02* (2023.01)
*B64U 101/00* (2023.01)
*B64U 101/40* (2023.01)

(52) U.S. Cl.
CPC ............... *A01M 5/02* (2013.01); *A01G 3/088* (2013.01); *B25J 11/0055* (2013.01); *B64C 39/024* (2013.01); *B64U 2101/00* (2023.01); *B64U 2101/40* (2023.01)

(58) Field of Classification Search
CPC ............ B64U 2101/00; B64U 2101/40; A01G 3/088; B25J 11/0055; A01M 5/02; B64C 39/024
See application file for complete search history.

(56) References Cited

U.S. PATENT DOCUMENTS

| | | | |
|---|---|---|---|
| 5,501,257 A * | 3/1996 | Hickman | A01G 23/091 144/34.1 |
| 2008/0073922 A1* | 3/2008 | Holtz | B25J 15/0213 901/1 |
| 2012/0279614 A1* | 11/2012 | Terrell | A01G 23/091 144/24.13 |
| 2016/0205872 A1 | 7/2016 | Chan et al. | |
| 2019/0200534 A1* | 7/2019 | Hawkins | B64U 30/20 |
| 2019/0274258 A1* | 9/2019 | Terrell | A01G 23/095 |
| 2019/0297783 A1* | 10/2019 | Terrell | A01G 23/087 |

FOREIGN PATENT DOCUMENTS

| | | | |
|---|---|---|---|
| CN | 108163188 A | * | 6/2018 |
| CN | 108551907 A | | 9/2018 |
| CN | 108934532 A | | 12/2018 |
| ES | 2 692 468 A1 | | 12/2018 |

* cited by examiner

*Primary Examiner* — Christopher D Hutchens
(74) *Attorney, Agent, or Firm* — Oliff PLC

(57) ABSTRACT

Pruning robot including means for removing processionary caterpillar nests, the robot being characterized in that it is carried by a drone provided with an onboard automaton, which is equipped with an electromechanical tool consisting of a gripper associated with a cutting device intended to cut the branches supporting the nests that are to be removed.

8 Claims, 15 Drawing Sheets

PRUNING ROBOT FOR REMOVING PROCESSIONARY CATERPILLAR NESTS

TECHNICAL DOMAIN

The invention relates to a weeding robot with an automaton carried by an existing small drone, or included in a specialized small drone, for eliminating pine processionary caterpillar nests, by approaching on its own the designated nest to automatically cut the branch on which it is installed.

STATE OF THE ART

Pine processionary caterpillars must be fought every year, as they represent a serious danger for children, allergic people and domestic animals. They can be found in all the countries around the Mediterranean Sea, where their presence continues to progress northwards. They are also present in many other hot countries of the world.

One of the most effective methods to eliminate them, is to shear the branch to which their white cocoon nest is attached with a splitter, and then to burn it after it has fallen to the ground.

But it is a difficult, expensive and sometimes dangerous operation that requires climbing in the trees, or more often to use a large ladder, or even a nacelle, to reach the nests installed on one of the highest branches of some conifers (Austrian pine, umbrella pine, cedars, etc. . . . )

Another method is to spray the infected trees from the ground. But this is not very effective and not very precise, because the nests are high, or even out of reach of the sprayer, which causes a significant waste of the product and some pollution.

A more recent method sprays these products from a large drone flown manually, but it requires an experienced pilot, and is only applicable to the treatment of large areas (an infested pine forest for example), and is practically unusable to treat isolated trees in residential areas of private properties.

Currently, small drones designed for aerial photography and video are marketed by several dozens of international suppliers.

They are lightweight, easy to transport, and very well equipped with multiple sensors and microprocessors controlled by very powerful sophisticated software.

They are able to maintain a hover with precision, in position, heading and altitude, and can detect and avoid obstacles thanks to their sensors.

Their remote control console allows them to be flown manually in direct vision or with FPV goggles.

This console can also be associated with a tablet on which specific applications display in real time what the front camera of the drone sees, and allow to pilot it manually, or better, to assign it complex pre-programmed missions that it will execute automatically.

These drones operate in several modes, some of them known as "intelligent", with which they can automatically identify some targets and follow them automatically.

The most advanced ones have a SDK (System Developer Kit) making possible additional customizable functions, to use differently already available software modules, to communicate with a new navigation application installed on the tablet, and even to communicate simply with the outside world by closing an accessible contact for example. All these drones, not designed to carry a tool, can nevertheless carry a significant load, in the order of half their own weight, provided they remain within the centering limits where a stabilized hovering flight is controllable by their autopilot.

This implies a correct distribution of the embarked load, and motors powerful enough to automatically correct immediately any attitude or roll lurch generating more important moments of inertia with a heavier eccentric mass to balance.

In a new fully automatic "intelligent" mode of operation, such a drone could safely, without great risk of "crashing", slowly approach a tree instead of trying to avoid it, identify a target on this tree (a large white spot) and bring an on-board automaton into contact with the base of this target, a nest of pine processionary caterpillars, so that it can cut its supporting branch.

Possible users: Gardening and Green Spaces Maintenance Companies, Forests Agencies, Town Halls, individual contractors, etc. . . . in all southern European countries, and certainly many other ones on all the continents.

OBJECT OF THE INVENTION

The object of the invention consists in offering an operator a small autonomous robot, relatively inexpensive compared to its potential, easily transportable and usable by everybody, to eliminate nests of pine processionary caterpillars, by automatically cutting the branch on which each nest is installed, without having complex skills, and by remaining on the ground in complete safety.

According to the invention, the robot is carried by a drone equipped with an on-board automaton, which is equipped with an electromechanical tool consisting of a gripper associated with a cutting device intended to cut the branches supporting the nests to be eliminated.

According to a preferred mode of implementation of the invention, the robot is equipped with a horizontal support pole carrying the electromechanical tool at the front, the centering of said robot being adjusted by the inertia control unit of the drone aided by a counterweight including the power supply battery of the robot.

The gripper of the electromechanical tool comprises a motorized articulated clamp which moves along the pole under the action of a first linear actuator controlled by a microprocessor of the automaton, a second linear actuator being arranged to move in synchronism said counterweight along the pole, to adjust the centering of the robot during the movements of the gripper when the central inertia unit of the drone is not able to do it alone.

Advantageously, the cutting device of the electromechanical tool comprises a circular saw rotatably driven by a first electric motor, said saw being provided with a rotating cutting disc forwardly offset from the first motor.

According to a feature of the invention, the articulated clamp is arranged under the cutting device, said clamp being actuated by a second electric motor driving the two jaws of the clamp between a closed position and an open position. For this purpose, the second motor of the clamp comprises a transmission system cooperating with two links intended to bring the two jaws together and move them apart, respectively in the closed position and in the open position.

According to another characteristic of the invention, the articulated clamp is supported by a first cylindrical tube intended to slide in a second tube of the frame to guide the advance or retraction of the gripper under the action of a control mechanism of the first actuator, the said frame being mounted on a ball bearing so as to pivot around the axis of the pole. Preferably, the control mechanism of the first actuator comprises a mechanical contactor equipped with a bumper cooperating with a push-button engaging with a connector for starting the automaton and closing the gripper as soon as the bumper strikes the branch supporting a nest.

The automaton is controlled by an electronic box containing a microprocessor intended to control the first and second motors as well as the first and second actuators.

Placed on the ground in front of an infested tree, in the direction of a nest to be eliminated, the robot searches for and finds this nest on its own, approaches it until it touches it, clings to the branch that supports it, cuts it, and returns to its starting base, mission accomplished, without any human intervention.

The invention also relates to an automatic process for locating and destroying a nest of pine processionary caterpillars on an infested tree, using a drone equipped with the aforementioned weeding robot.

The operator locates the nest of pine processionary caterpillars that he must eliminate, on the infested tree where it is installed.

On a suitable starting base on the ground, he places in front of this tree, an autonomous robot, consisting of a small drone carrying an automatic weeding device, and directs it towards this nest. It powers up the various components of the electronic box, and from a tablet, it launches a standard automatic pre-programmed mission, always the same, without any input of parameters, and during which, except incident, it will not intervene. The drone takes off, climbs vertically keeping its starting heading, looking for the nest, a large white spot, easy to identify. When it has found it, it hovers at the altitude of the nest, and defines in its collimator the target to be reached: a small brown stem, a few centimeters below the base of the white spot. The drone then advances horizontally towards this target, while remaining on the starting heading, all the trajectory corrections possibly necessary being made automatically, without swivelling, with automatic commands of very small amplitude: Left, Right, Up, Down, Forward and Backward only. At about 1 meter from the target, the drone slows down, refines the aiming of its collimator, and continues its progression at a very low speed until the bumper of the on-board tool hits the branch supporting the nest, which activates the automaton. The weeding automaton gripper closes on the branch carrying the nest in a few seconds, possibly pivoting around its horizontal axis so that the plane of its two jaws is substantially perpendicular to the axis of the branch to ensure effective clamping. The drone is now attached to this branch. The circular saw starts automatically. A linear actuator moves the gripper backwards from the saw blade. The branch is cut in a few seconds. The recoil of the gripper of several centimeters modifies the centering of the drone, but this imbalance is compensated immediately by a counterweight which advances in synchronism under the action of a second linear actuator. If the drone is equipped with motors with a sufficient power reserve, and if the displacement of its center of inertia remains within the limits controllable by its autopilot, the displacement of the counterweight is not necessary, and the second actuator is useless. Once the branch is cut, the drone is still attached to it because it has been cut above the gripper. The nest falls, and the white spot disappears from the view of the drone, which reverses its course to the opposite direction of the starting course, while remaining attached to the branch. After a few seconds, the circular saw stops, the gripper and the counterweight return to their initial positions, the gripper loosens and the drone moves back to the vertical of its starting base, then it descends and lands, its mission completed. In case of incident, the drone abandons the mission and returns to land where it started by following the reverse route. The operator will then have to move the departure base by choosing a different vertical plane of approach, and restart the weeding mission. Under some exceptional conditions, specified in the detailed operating procedure, it is possible to let the operator designate the target on his tablet and manually adjust, in small steps, the final approach of the drone to pinch the targeted branch.

BRIEF DESCRIPTION OF THE DRAWINGS

Other advantages and characteristics will become clearer in the following description of particular modes of realization and implementation of the invention given as non-limiting examples and represented in the attached drawings, in which.

DESCRIPTION OF THE OPERATING METHODS

Figure 1:
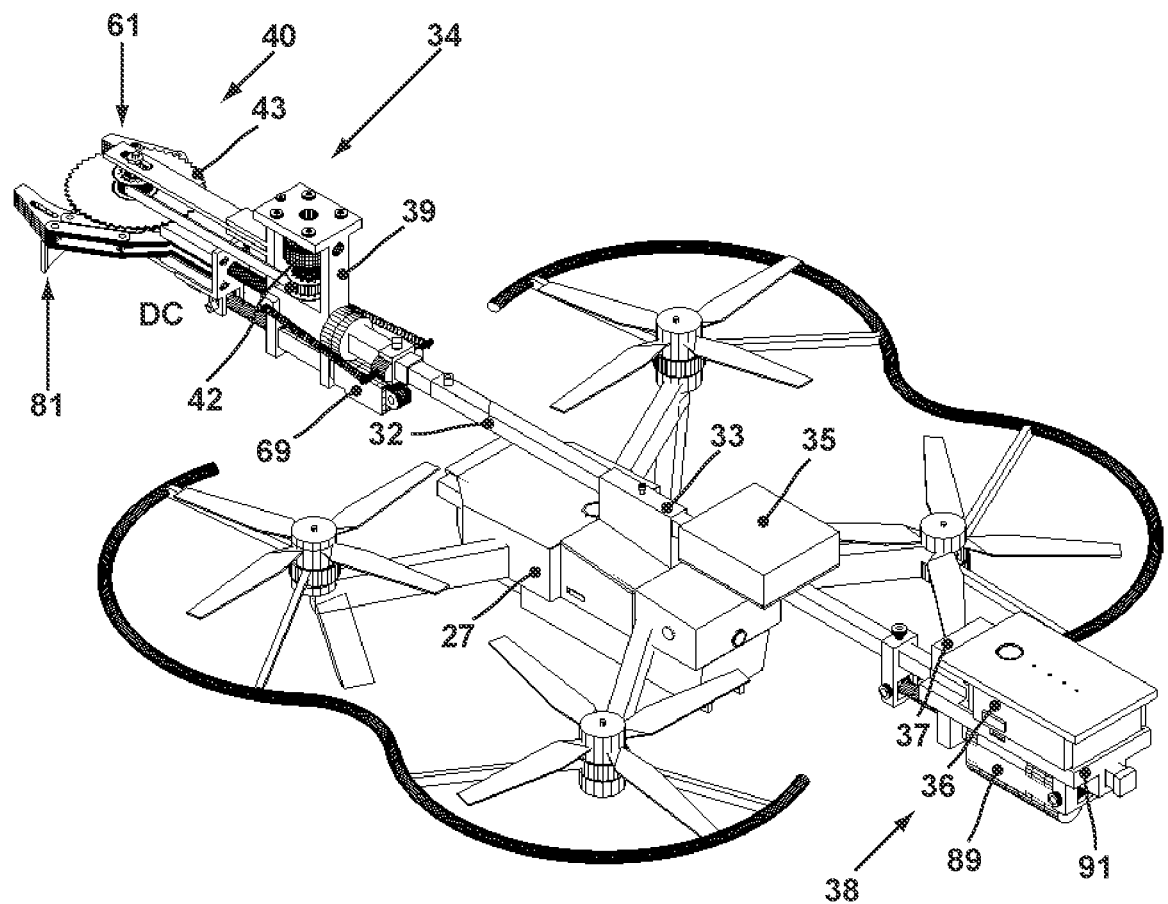
FIG. 1, is a complete perspective view, of a declination of a weeding robot 29 object of the invention.

According to FIG. 1, the weeding robot 29 is a drone 27 which carries on a horizontal pole 32, a weeding automaton 34, a contactor 81, an electronic box 35 and a counterweight 38. The on-board device assembled on the pole 32, is attached to the drone 27 by a removable mechanical mounting device 33. The weeding automaton 34 is positioned at the front of the pole 32, in front of the mounting device 33. The electronic box 35 is fixed on the pole 32 behind the mounting device 33. The weeding automaton 34 is built on a frame 39, with a circular saw 40, associated with an articulated and motorized gripper 61. The circular saw 40 has a cutting disk 43 offset forward from a first motor 42. The gripper 61 can move backward or forward under the cutting disk 43 with the second linear actuator 69. When hit, the contactor 81 starts the weeding automaton 34: The jaws of the gripper 61 close, the circular saw 40 starts, the gripper 61 moves back under the cutting disc 43, which saws what the gripper 61 holds. A battery 36 and power supply 37, mounted on a nacelle 91 serve as a counterweight 38 to the rear of the pole 32. A first linear actuator 89 mounted below the nacelle 91 moves backward or forward with the counterweight 38 to maintain the centering of the robot 29 when the gripper 61 moves.

The drone 27 is a small flying machine with the following features:

At least four rotors (quadcopter)

Can lift up to several tens of meters, a total mass of the order of a kilogram, while remaining perfectly controllable Richness in optical, ultrasonic and/or laser sensors (LIDAR)

Frontal camera with display on a touch pad.

Stable hovering flight possible in autopilot mode

Modular standard control software with several "intelligent" flight modes, including the execution of pre-programmed missions, and the tracking of a designated target.

Selective obstacle detection, with distance measurement

SDK (System Development Kit) available to add functions to its standard software and/or otherwise process sensor measurements to modify in flight navigation parameters, for example.

Several suppliers, under French or international trade marks, manufacture and sell drones meeting these specifications.

Figure 2:
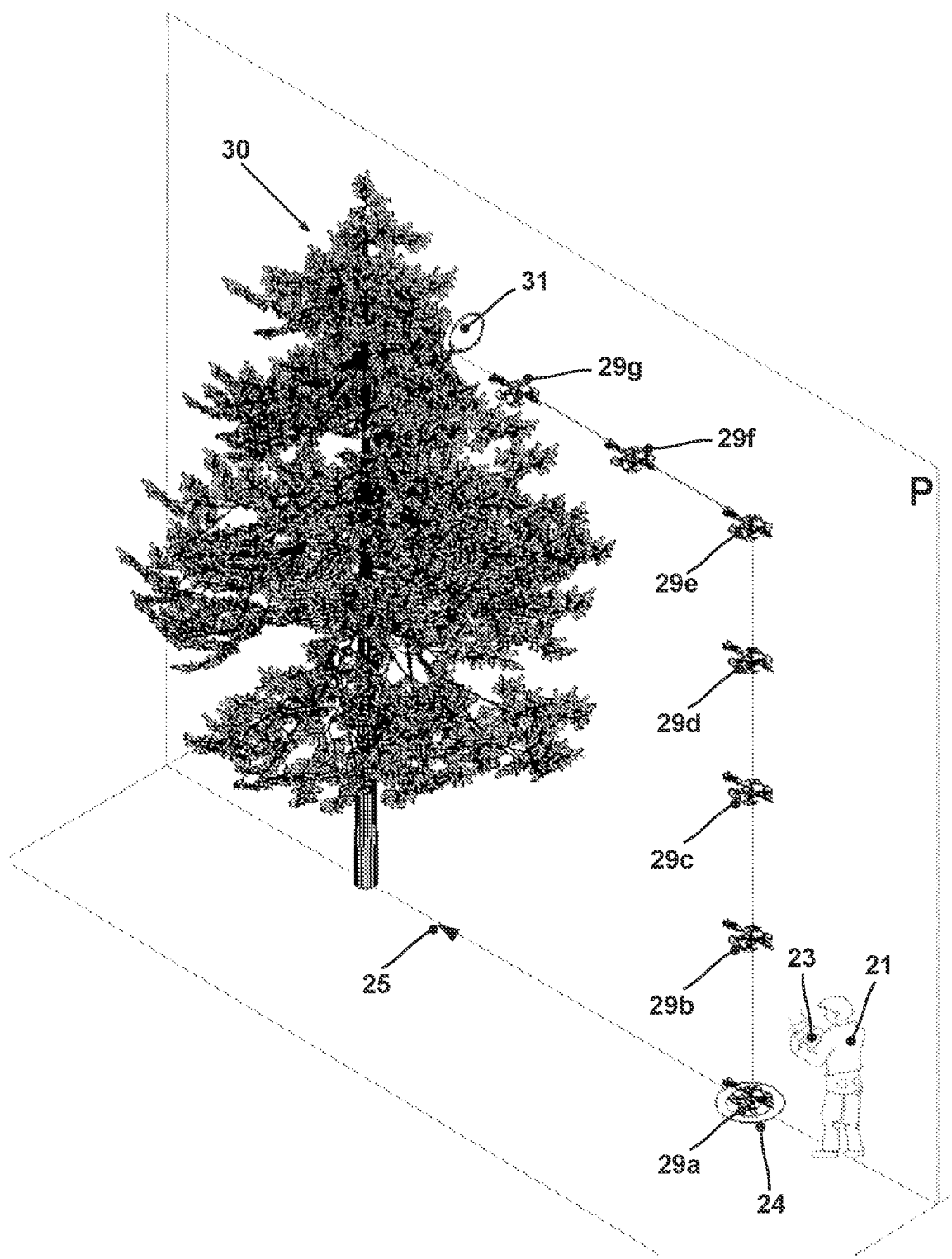
FIG. 2, shows in perspective a human operator 21 and the successive positions of a weeding robot 29, from a take-off mat 24, to a very short distance from its target, a nest 31 of pine processionary caterpillars.

According to FIG. 2, an operator 21 locates on an infested tree 30, a nest 31 of pine processionary caterpillars he must eliminate, and chooses a vertical plane of approach "P", free of any obstacle. He places the weeding robot 29 (a small drone carrying a weeding automaton) on the ground in front of the tree 30, on a suitable takeoff mat 24, and orients it in the plane "P", to the magnetic heading 25 of the nest 31.

Figure 3A:
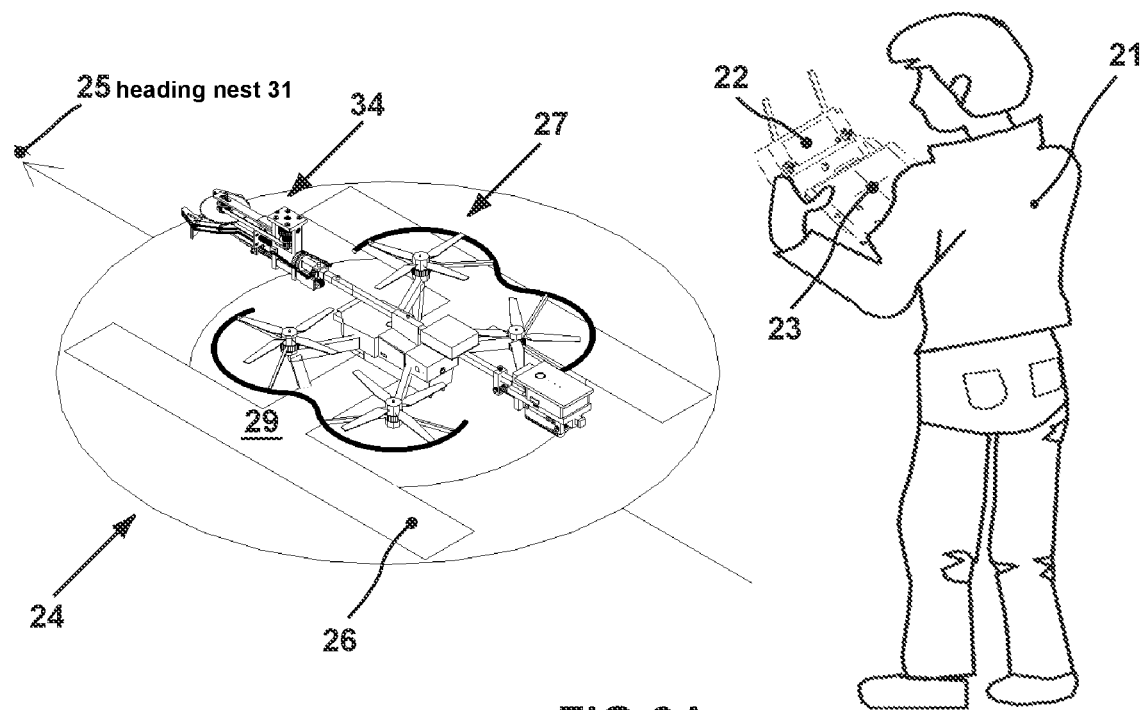
FIG. 3A is a perspective view of the weeding robot 29, correctly positioned on the take-off mat 24, in the direction 25 of the nest 31 to be removed, and ready to take off in front of the operator 21.
Figure 3B:
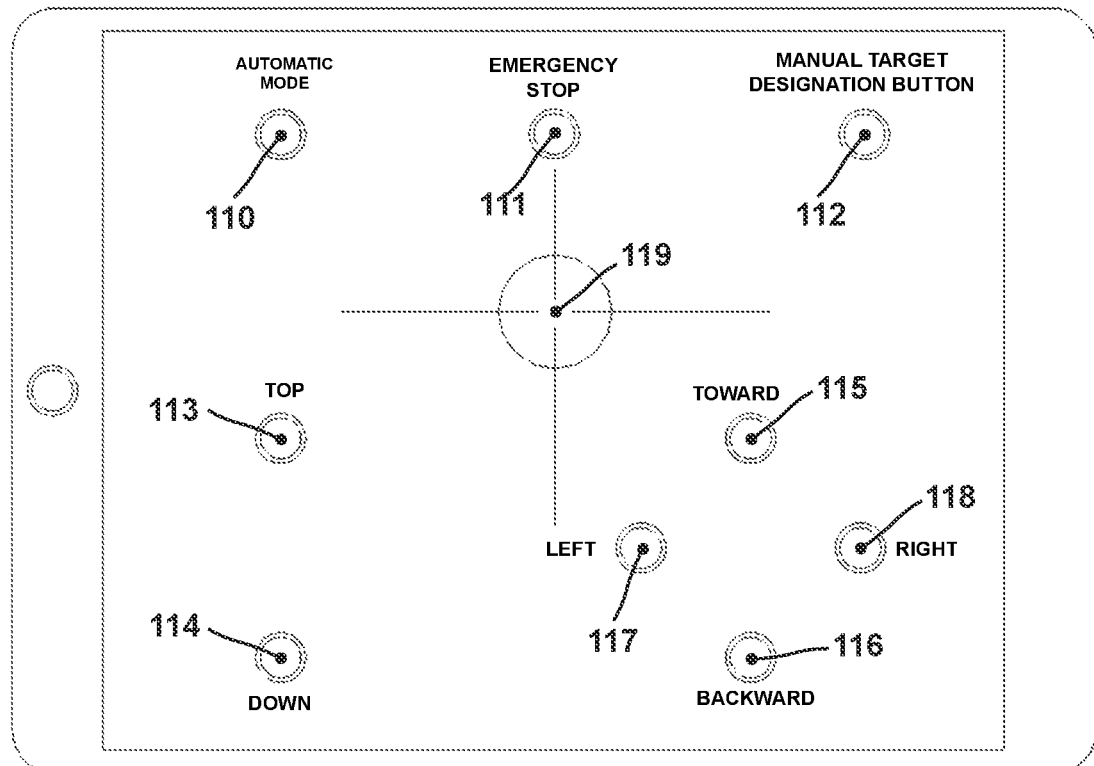
FIG. 3B, is a simplified diagram of the screen of a tablet 23 with an aiming collimator 119 and main buttons 110 to 118.

According to FIG. 3A, the operator 21 has a console 22 for remote control of the drone 27, associated with a tablet 23 whose navigation application automatically executes a pre-programmed mission, described in detail in pseudo code on pages 21 to 30. The takeoff mat 24 is correctly positioned, with the two vertical bars 26 of its "H" parallel to the heading 25 of the nest 31. The operator 21 powers up the console 22, the tablet 23 and the various components of the robot 29, According to FIG. 3B, by pressing the button 110 on the tablet 23, the operator 21 starts a standard automatic pre-programmed mission, always the same, without any input of parameters, and during which, except for incidents, he will not intervene.

The screen of the tablet 23 permanently displays the vision of the front camera of the drone 27 and relevant information on the progress of the mission. An emergency stop button 111 can stop the mission and return the drone 27 to its home base, the takeoff mat 24. Under exceptional conditions, if the drone 27 does not find the nest 31, or fails to grip the branch 80, and if the operator 21 has the required qualifications and authorizations, the operator 21 can take control of the drone 27 by manually piloting it with short pulses on the buttons 113-118, and control its action with the aiming collimator 119.

Returning to FIG. 2, the drone 27 takes off carrying the weeding automaton 34, climbs vertically at the starting heading 25, looking in front of it for the nest 31, a large white spot, easy to identify, and the weeding robot 29 passes successively through the positions 29a, 29b, 29c, etc. . . .

When the drone 27 has found the white spot, thus the nest 31, it is in position 29e, at the altitude of the nest. It defines in its collimator the target to be reached: a small brown stem, a few centimeters below the base of the white spot.

The drone 27 then advances horizontally towards this target while remaining on the starting heading 25, and passes successively through positions 29e, 29f, 29g, All the necessary trajectory corrections are made without manual intervention by the drone navigation software, without any pivoting, with automatic commands of very low amplitude: Left, Right, Up and Down only. At about 1 meter from the target, in position 29g, the drone 27 slows down, refines its aiming, and continues its progression at very low speed until the bumper of the contactor of the weeding automaton strikes the branch supporting the nest 31. The rest of the process is described from the description of FIGS. 11A and 11B.

The following FIGS. 4A through 10B describe the components of the weeding automaton 34.

Figure 4A:
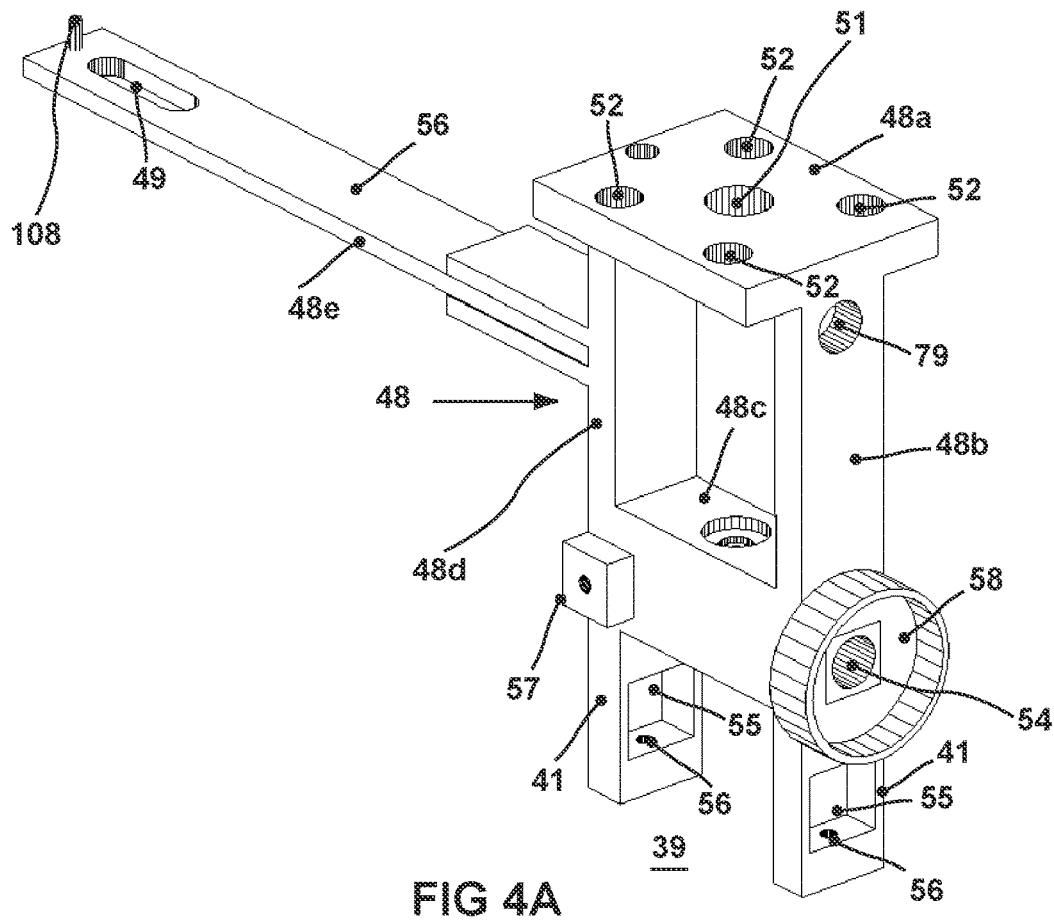
FIG. 4A is a perspective view of a frame 39 of the weeding automaton 34.
Figure 4B:
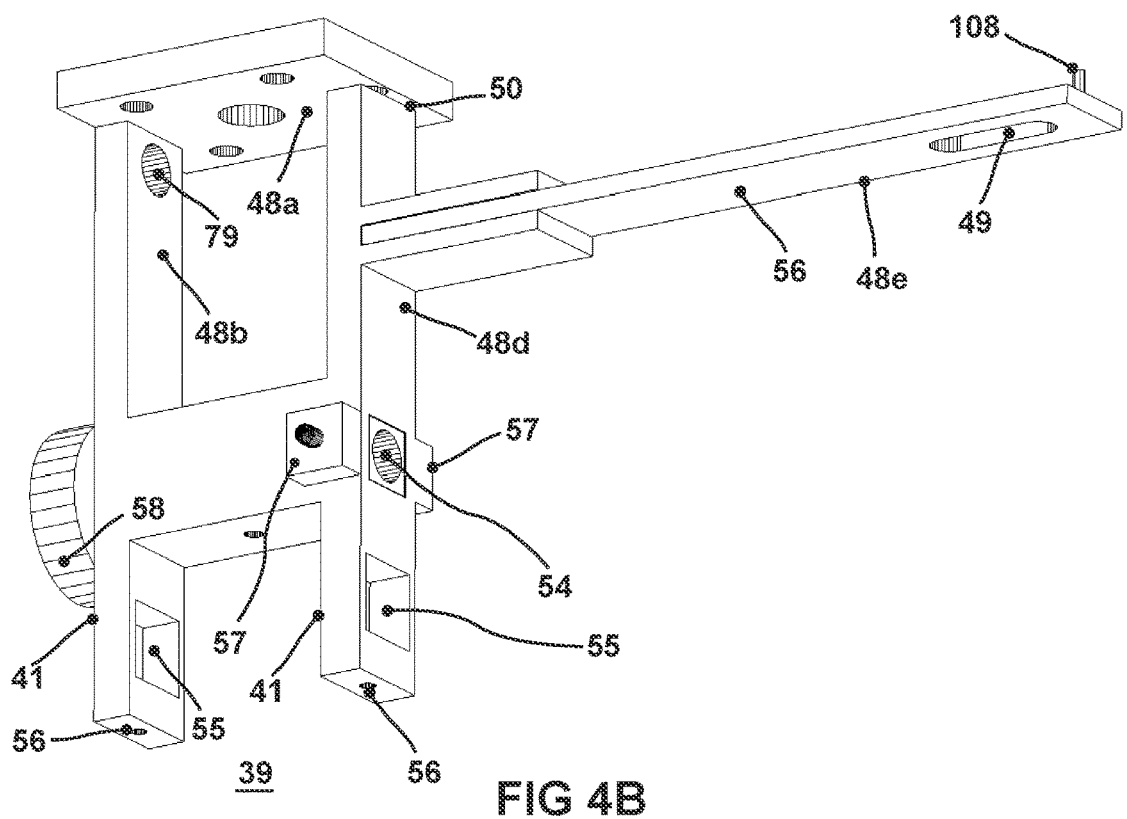
FIG. 4B is another perspective view of a frame 39 of the weeding automaton 34.
Figure 6A:
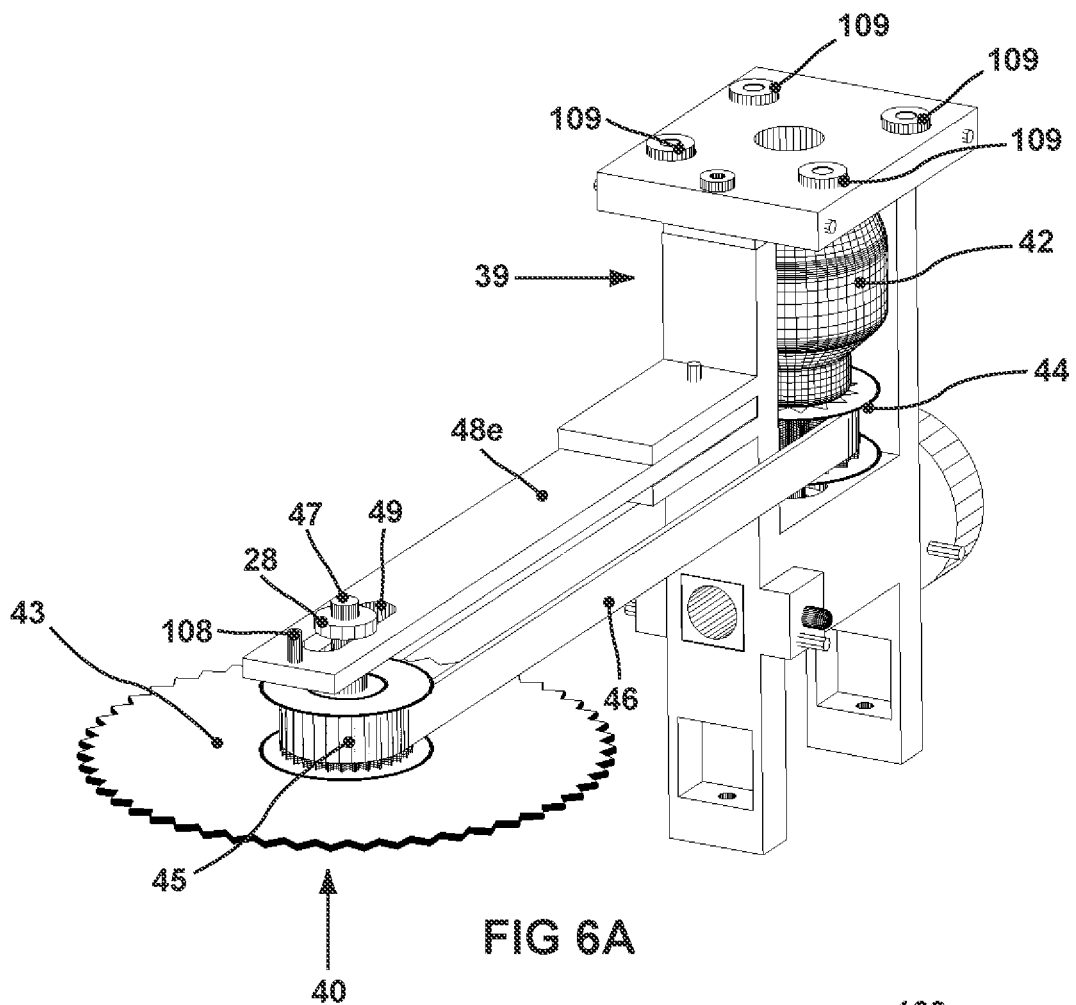
FIG. 6A shows a circular saw with a first motor 42, a cutting blade 43 and a toothed belt 46, all mounted on the frame 39.
Figure 6B:
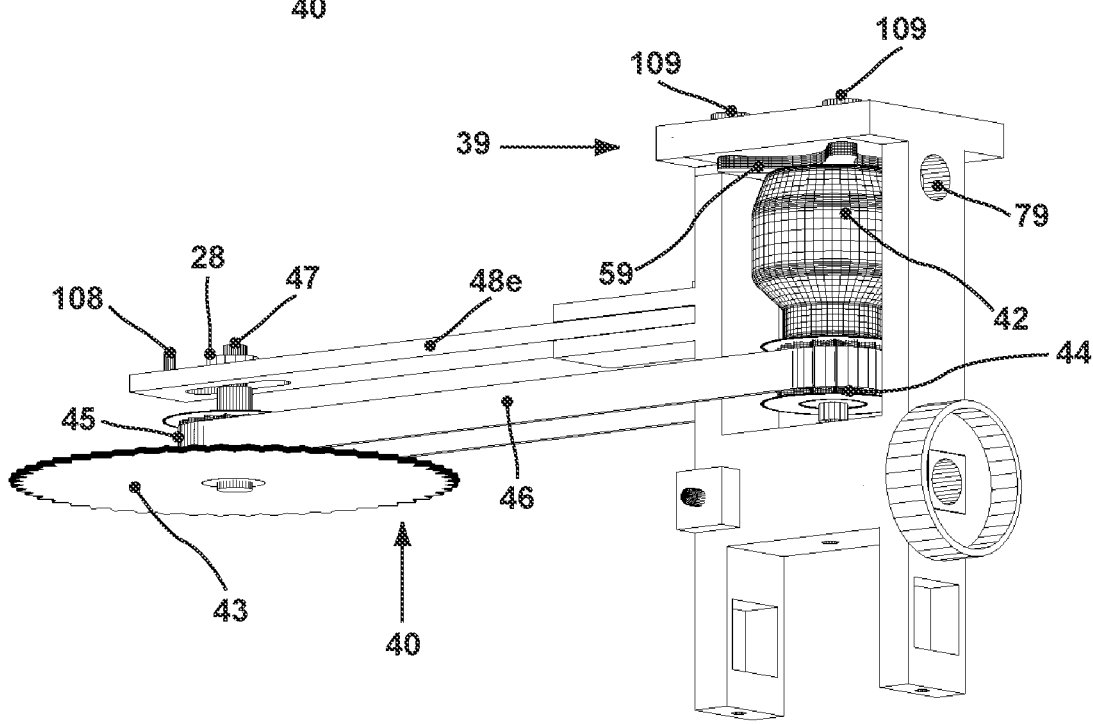
FIG. 6B shows another view of a circular saw with a first motor 42, a cutting blade 43 and a toothed belt 46, all mounted on the frame 39.

According to FIGS. 4A and 4B, the frame 39 is a rigid, lightweight, one-piece assembly, which may be made by bonding carbon fiber plates and tubes, by injection molding, by 3D printing, or by a combination of these processes. The upper portion of the frame 39 supports the cutting device DC (first motor 42 of the circular saw 40, cutting disc 43 and notched belt 46), as illustrated further in FIGS. 6A and 6B. The upper portion of the frame 39 is a narrow, rigid cage 48 with a long, horizontal, rigid plate 48e firmly attached perpendicular to the front face 48d. The wider top face 48a of the cage 48 has four holes 52 for bolting on a spider 59 for attaching the first motor 42, and a central hole 51 for passing the shaft of the first motor 42. The rear face 48b of the cage 48 is pierced with a hole 79 for the passage of the power and control wires of the first motor 42. Underneath the lower face 48*e* integral with the rear face 48*b* of the cage 48, a tubular bracket 41 is attached which supports the gripper 61 and the second linear actuator 69, as illustrated further in FIGS. 7A and 7B. The front face 48*d* of the cage 48 is separated from the top face 48*a* by a very thin slot 50 (about 1.5 mm) to allow the notched belt 46 to pass through during installation. Once the belt 46 is in place, the upper face 48*a* and the front face 48*d* of the cage 48 are made integral with a shim and a small tightening bolt not shown. The oblong hole 49 at the end of the plate 48*e* is used to adjust the tension of the notched belt 46. The ball bearing pin 47 of the pulley 45 integral with the cutting disc 43 is secured by a nut 28 as shown in FIGS. 6A and 6B.

The lower portion of the frame 39, below the face 48*c* is the tubular bracket 41. The top portion of the tubular bracket 41 has a cylindrical hole 54, in which the first cylindrical tube 63, supporting the gripper 61, can slide parallel to the plate 48*e* and rotate. At the rear and in line with the cylindrical hole 54, the first cup 58 accommodates the ball bearing 60. On each side of the front of the tubular bracket 41, the two bosses 57 are the attachment points for the two springs 71, which connect the frame 39 to the pole 32.

The lower part of the tubular bracket 41 is a double housing 55 where the body of the second linear actuator 69 is embedded, held in position by two small locking screws tightened in the two tapped holes 56.

Figure 5A:
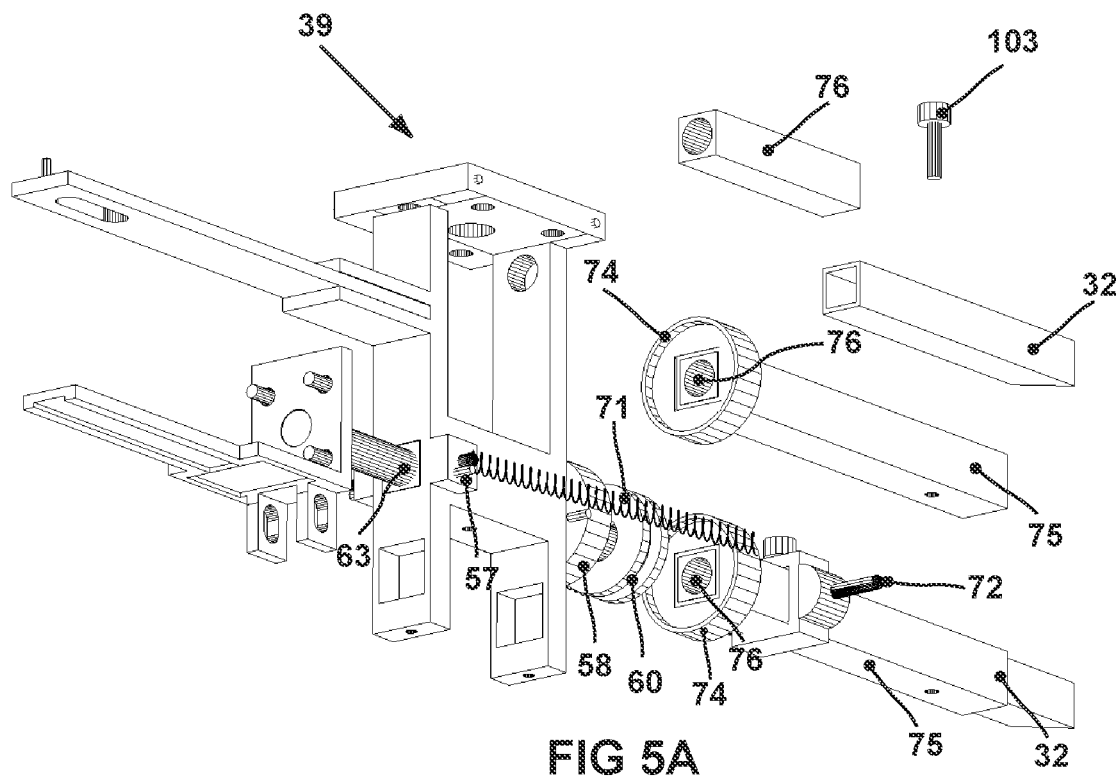
FIG. 5A is an exploded perspective view of the connection between the frame 39 of the weeding automaton 34 and a pole 32 that supports it.
Figure 5B:
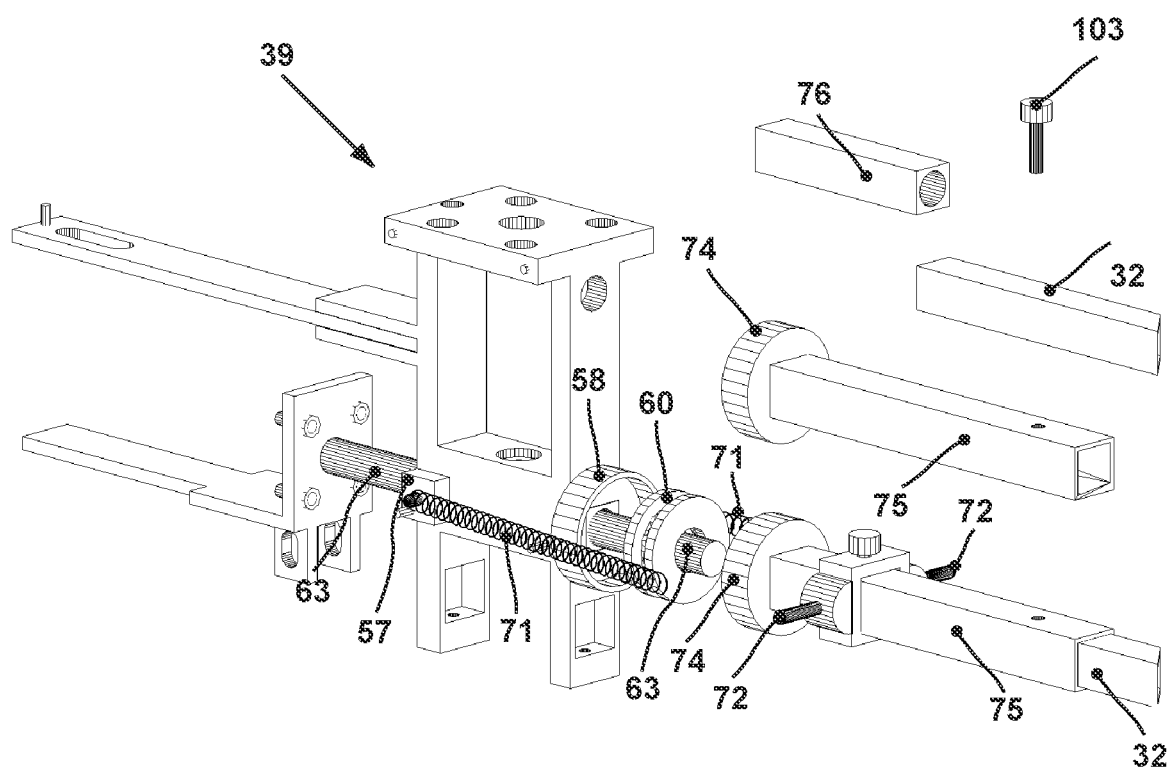
FIG. 5B is another exploded perspective view of the connection between the frame 39 of the weeding automaton 34 and a pole 32 that supports it.

According to FIGS. 5A and 5B, the connection between the frame 39 and the pole 32 is shown in an exploded view. The pole 32 and a sleeve 75 have a square outer and inner cross section. A tube 76 has a square outer section and a cylindrical inner section. The tube 76 is glued or crimped inside the sleeve 75 on its first front half. A second cylindrical cup 74 is at the front of the sleeve 75. Two spreader bars 72 are attached to each side of sleeve 75. The rear half of the sleeve 75 is fitted over the front of the pole 32 and locked by a bolt 103. The first round tube 63, the holder of the gripper 61, is slidable and rotatable within the sleeve 75, into the tube 76 and the front end of the pole 32. The first tube 63 passes through the ball stop 60 whose inside diameter is greater than that of the first tube 63. The two springs 71, stretched between the bosses 57 and the spreader bars 72, hold the ball stop 60 in position in the troughs 58 and 74, while allowing the frame 39 to pivot around the axis of the pole 32.

According to FIGS. 6A and 6B, only the circular saw 40 is shown, mounted in the frame 39. The first motor 42 is screwed with a crosspiece 59, under the upper face 48*a* of the frame 39, inside the cage 48. The cutting disc 43 of the circular saw 40, is offset forward so that the first motor 42 does not hit the nest 31 whose branch 80 is to be cut. The cutting disc 43 is integral with a first toothed pulley 45, which is mounted on a ball bearing around a shaft 47. The axis 47 is bolted in the oblong hole 49 at the end of the rigid plate 48*e* by adjusting the tension of the notched belt 46. A second notched pulley 44, bolted to the rotor shaft of the first motor 42, drives the first notched pulley 45 of the cutting disk 43, with a notched belt 46.

Figure 7A:
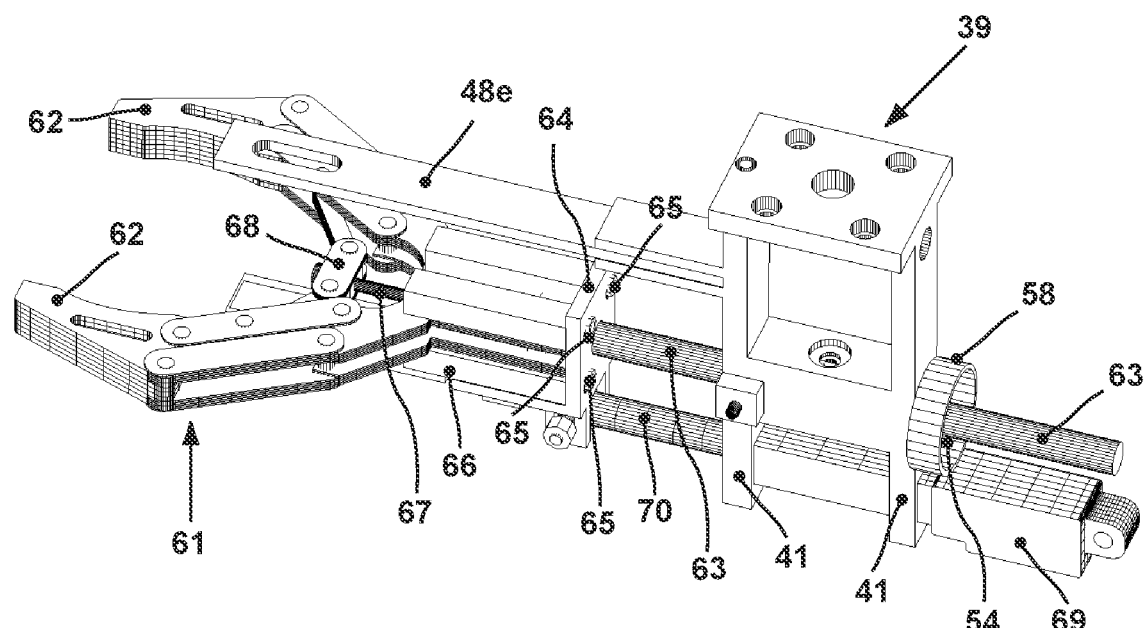
FIG. 7A shows the gripper 61 and the contactor 81, mounted on the frame 39.

According to FIG. 7A, the articulated gripper 61, is actuated by a second electric motor 66 whose axis is a threaded rod 67 that rotates in a nut 68. The nut 68 pulls or pushes with two links, the two jaws 62 which spread as widely as possible in open position (at least 7 centimeters). The second electric motor 66 is sufficiently powerful to guarantee a sufficient tightening of the two jaws 62, preventing any significant slipping of the pinched branch 80. A first cylindrical tube 63 is integral with a plate 64, the back of a cradle 83, to which the back of the second motor 66 is attached by four bolts 65. The first tube 63 can slide and rotate in the cylindrical hole 54 of the frame 39. The second actuator 69 controls the advance or retraction of the gripper 61 with the end of a piston 70 bolted under the rear of the cradle 83 of the second motor 66.

Figure 7B:
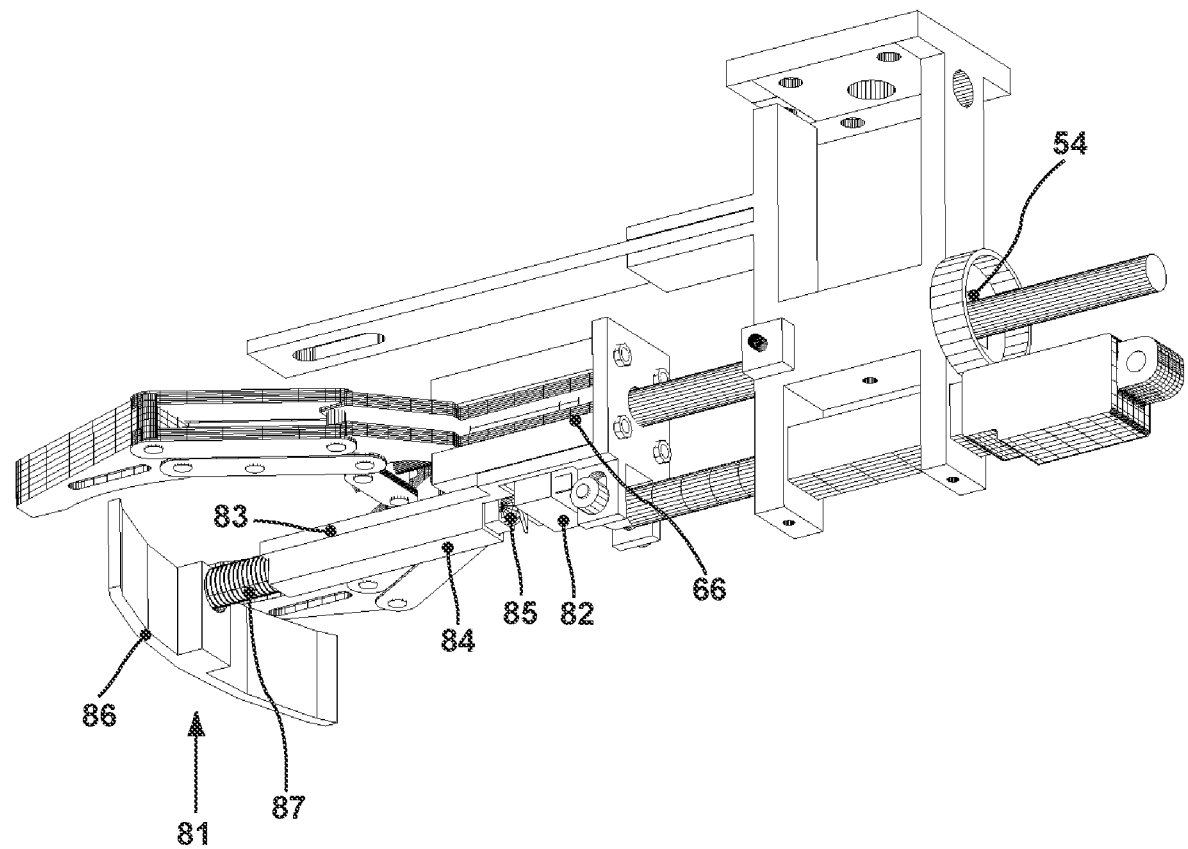
FIG. 7B shows another view of the gripper 61 and the contactor 81, mounted on the frame 39.

According to FIG. 7B, a contactor 81 is bonded or welded under the cradle 83 of the second motor 66. A mini connector 82 is glued under the cradle 83, as well as a tube 84 with a square cross-section on the inside and outside. A pusher 85 of square section slides inside the tube 84. A bumper 86, a curved rectangular plate, fixed to the front end 11 of the pusher 85 perpendicular to its axis, is the collision zone between the robot 29 and the nest 31, i.e. between the weeding automaton 34 and the branch 80 supporting the nest 31. A compression spring 87 pushes the bumper 86 forward. The rear end of the pusher 85 is in contact with the tongue of the connector 82, but also serves as a stop by limiting the forward travel of the pusher 85. When both jaws 62 of the gripper 61 are open, the bumper 86 protrudes slightly to either side, and is plumb with the front edge of the cutting disk 43. When the branch 80 supporting the nest 31 is struck by the bumper 86, it is pinched between the two jaws 62 of the gripper 61, and the cutting disk 43 cuts through the branch 80 instead of pushing it forward, because the bumper 86 is high enough to prevent the branch 80 from tipping into the jaws 62 of the gripper 61, which also exert sufficient pressure to keep the branch 80 firmly pinched.

Figure 8:
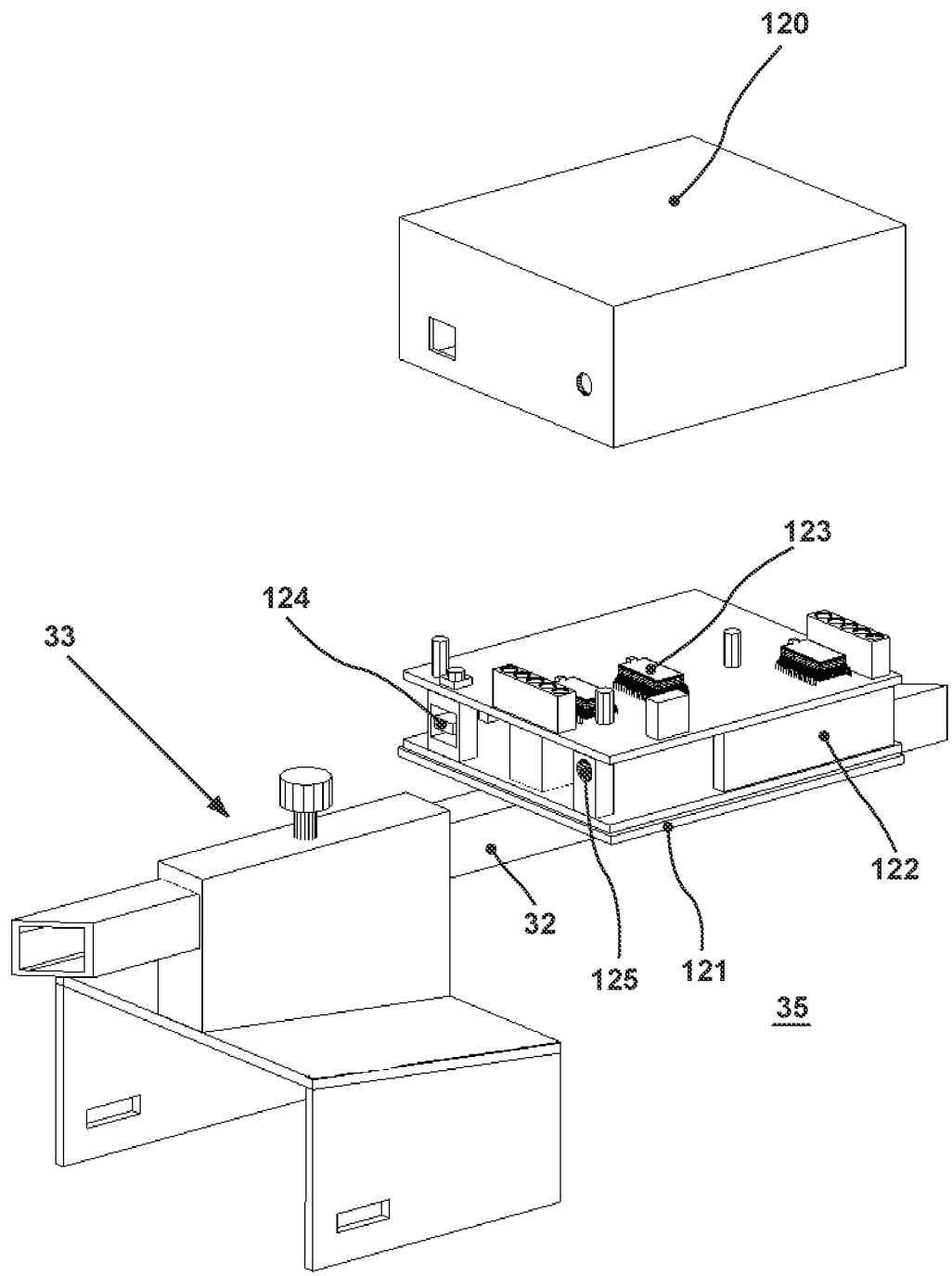
FIG. 8 shows the electronic box 35 positioned on the pole 32, behind the slide 127 of the mounting device 33 on the drone 27.

According to FIG. 8, the electronic box 35 consists of a microprocessor 122 (Arduino UNO or similar) topped with a shield 123 (MotorShield v2.3 Adafruit Industries or similar) to drive the four motors of the weeding automaton 34 (circular saw 40, gripper 61 and two linear actuators 69 and 89). The electronic box 35, protected by a transparent cover 120, is fixed on a plate 121 glued on the pole 32 behind the fixing device 33.

Two power supply sockets are provided, one socket 124 for the 5.4 V, and a second socket 125 for the 11.1 V (LIPO 3S) or the 14.8 V (LIPO 4S).

Figure 9A:
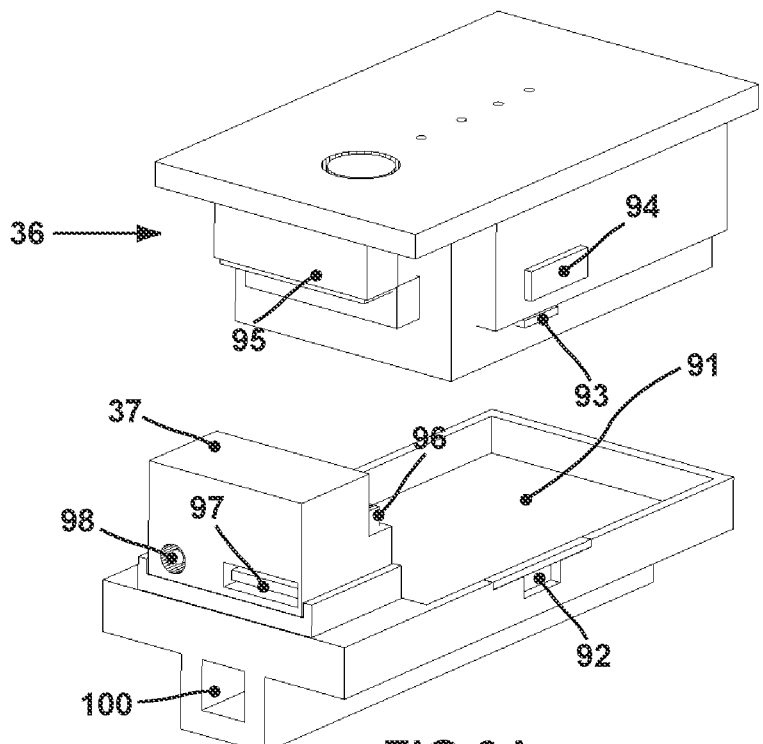
FIG. 9A shows the battery 36 of the automaton, detached from its support 91.

According to FIG. 9A, a perspective exploded bottom view shows a battery 36 of the automatic weeding machine 34, together with a support cradle 91, and a power supply 37, all mounted on the pole 32 to balance the weeding automaton 34 by serving as a counterweight. The battery 36, is normally of a model identical to that of the drone 27, for reasons of convenience of use, in particular to recharge it. It is for example a battery LIPO 3S (11.1 V) or 4S (14.8 V). The battery 36 is easily removable, embedded in the cradle 91, whose square-section tube 100 can slide along the back of the pole 32. The cradle 91, is a rectangular box where the battery 36 is embedded, with at the front, a platform where the power supply 37 is fixed. On each side of the battery 36, two latches 93 lock automatically in two notches 92 of the cradle 91. A pressure on the two buttons 94 of the battery 36, allows to unlock it and to withdraw it from the cradle 91. The set can be secured by 2 removable rubber straps, not shown, surrounding the pole 32 with the battery 36. The battery 36 connects with a connector 95, to a connector 96 of the power supply 37. A DC voltage of 5.5 V with a low current on a plug 97 supplies the housing 35 of the control electronics of the automaton. A higher voltage of 11.1 V (3S) or 14.8V (4S), with a high current available from a tap 98, powers the motors of the weeding automaton 34.

Figure 9B:
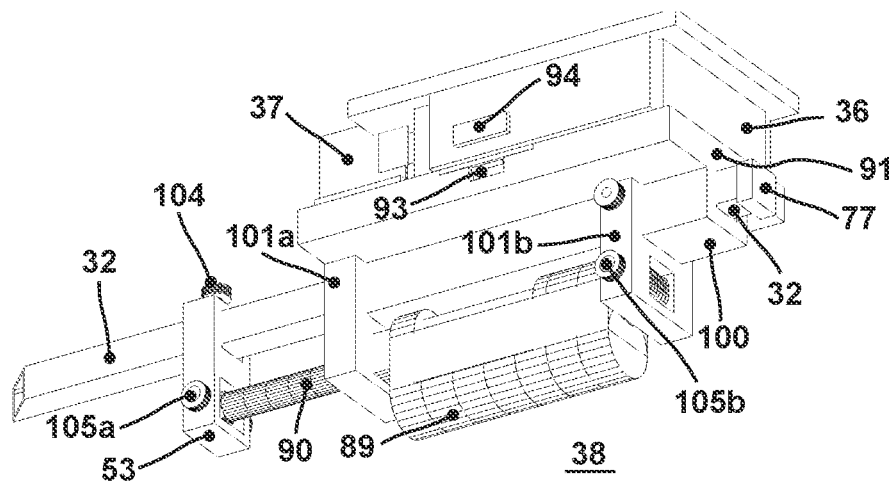
FIG. 9B shows the back of the pole 32 equipped with an adjustable counterweight 38

According to FIG. 9B, a perspective bottom view shows the rear of the weeding automaton 34, with the adjustable counterweight 38 slidable at the end of the pole 32.

In this embodiment of the invention, the weeding automaton 34, is carried by an existing drone 27, whose motorization and autopilot cannot immediately balance any centering imbalance of the robot 29 induced by the movement of the gripper 61 relative to the cutting disc 43 of the circular saw 40, the preferred cutting tool. The adjustable counterweight 38 is then required. A first linear actuator 89, is programmed to slide the cradle 91 in synchronism with the displacement of the gripper 61, and thus maintain the centering of the robot 29 within limits compatible with the autopilot of the drone 27. The body of the first actuator 89 is held by two brackets 101a and 101b in a fixed position under the front of the tube 100 of the cradle 91. The front bracket 101a is integral with the cradle 91. The rear bracket 101b slides along the tube 100 during the assembly of the actuator 89, then is blocked by 2 tightening screws on both sides of the tube 100. A bolt 105b immobilizes the actuator 89 under the nacelle 91 in the bracket 101b. The end of the piston 90 of the first actuator 89 is connected by a bolt 105a to a stop 53 locked after adjustment on the pole 32 by a bolt 104.

Figure 9C:
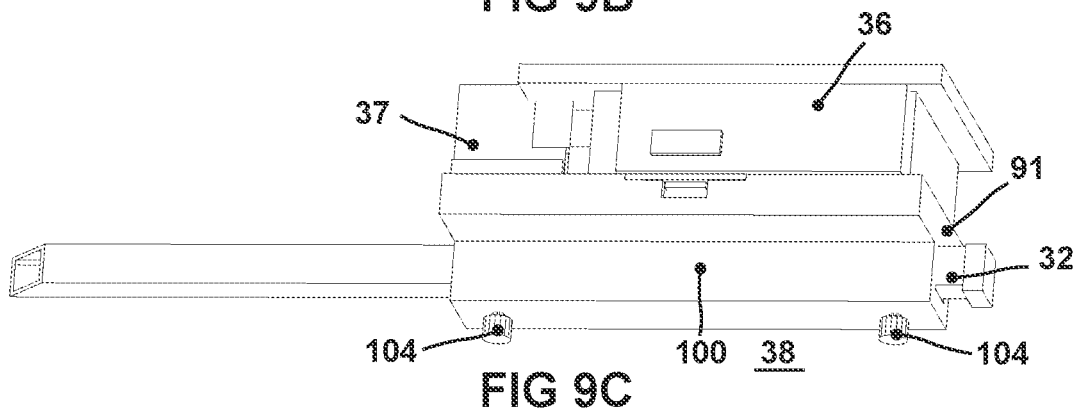
FIG. 9C shows the back of the pole 32 equipped with a fixed counterweight 38.
Figure 10A:
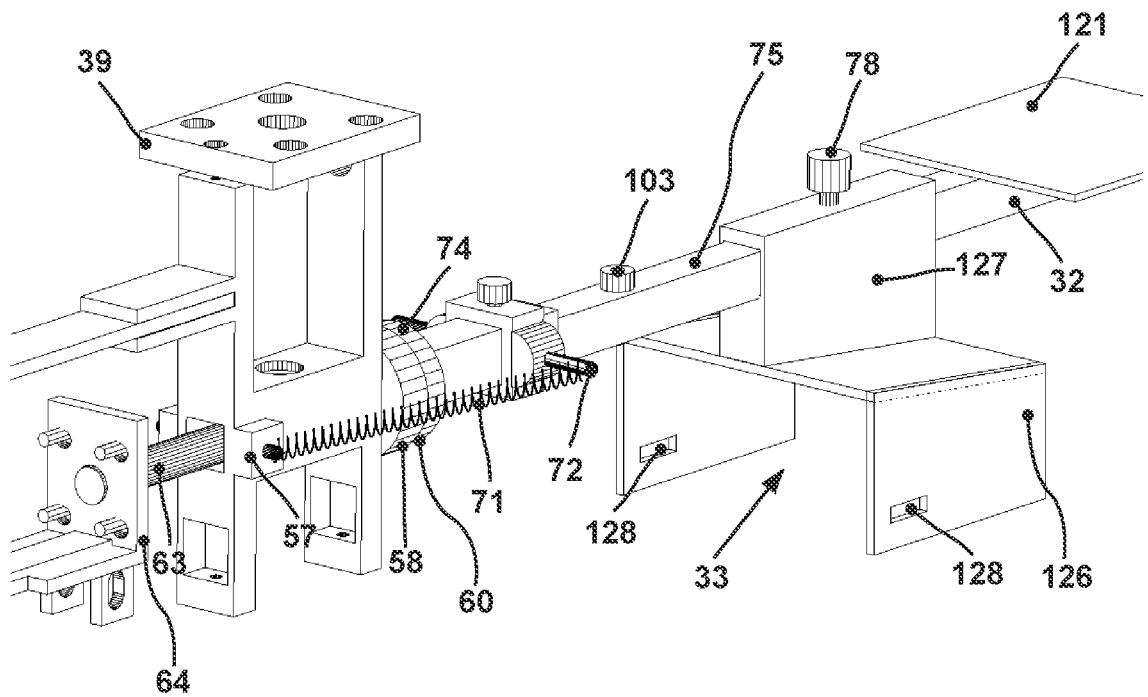
FIG. 10A shows the front of the pole 32, in a possible embodiment of an attachment device 33 on a drone.
Figure 10B:
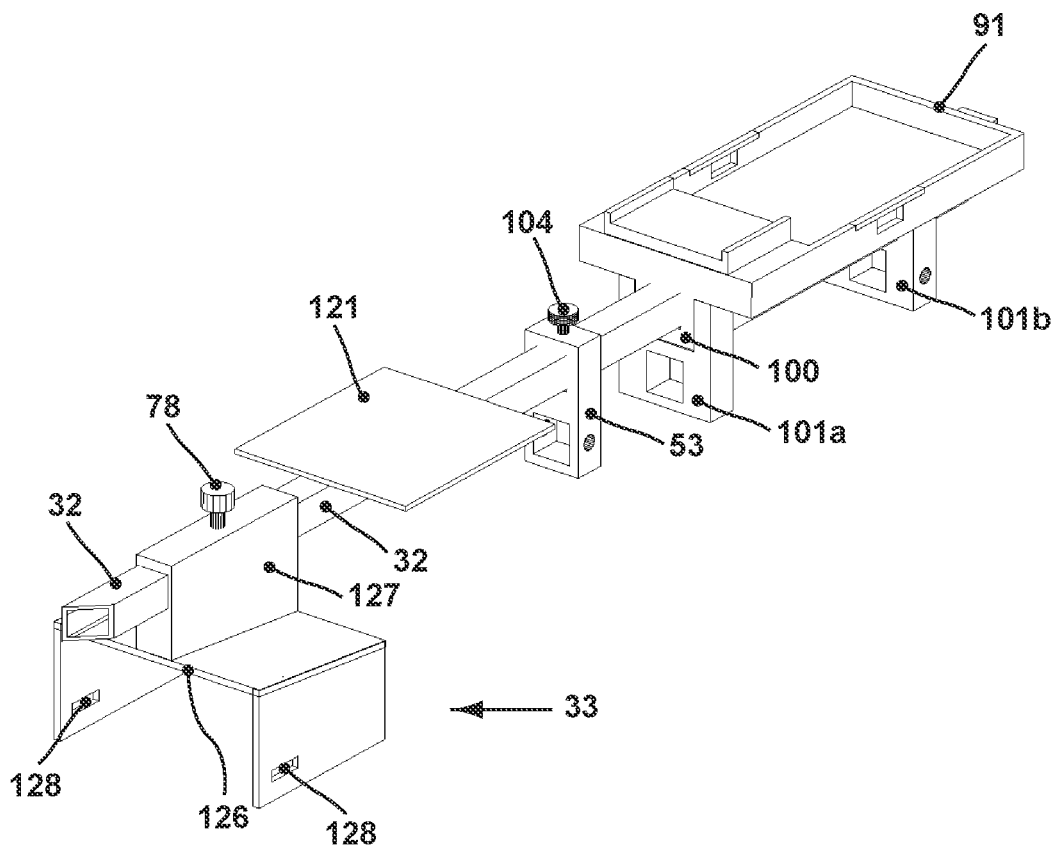
FIG. 10B shows the rear of the pole 32, in a possible realization of a possible attachment device 33 on a drone.

According to FIG. 9C, a top perspective view shows the rear of the weeding automaton 34, with the counterweight 38 in a fixed position below the end of the pole 32. In this embodiment of the invention, the weeding automaton 34 is carried by an existing drone 27, whose motorization and autopilot can immediately balance any centering imbalance of the robot 29 induced by the movement of the gripper 61 relative to the cutting disk 43 of the circular saw 40. The counterweight 38 is nevertheless required, but after adjustment it remains locked in a fixed position on the pole 32 by two bolts 104 tightened into two threaded holes under the tube 100, and there is no actuator to move the cradle 91.

Figure 11A:
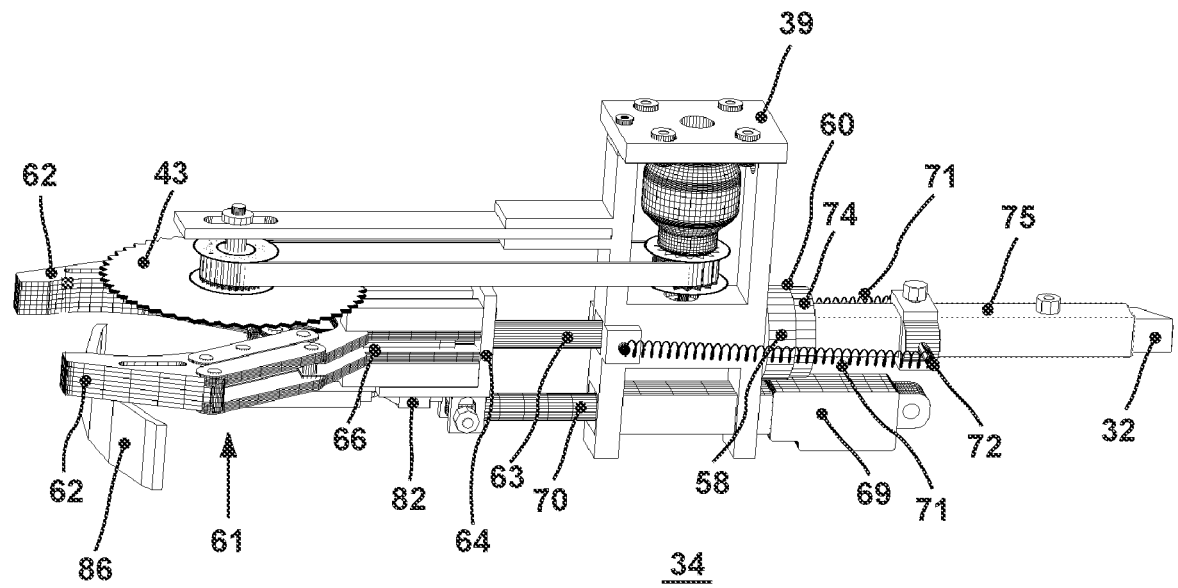
FIG. 11A shows the weeding automaton 34, with the two jaws 62 of the gripper 61 wide open.
Figure 11B:
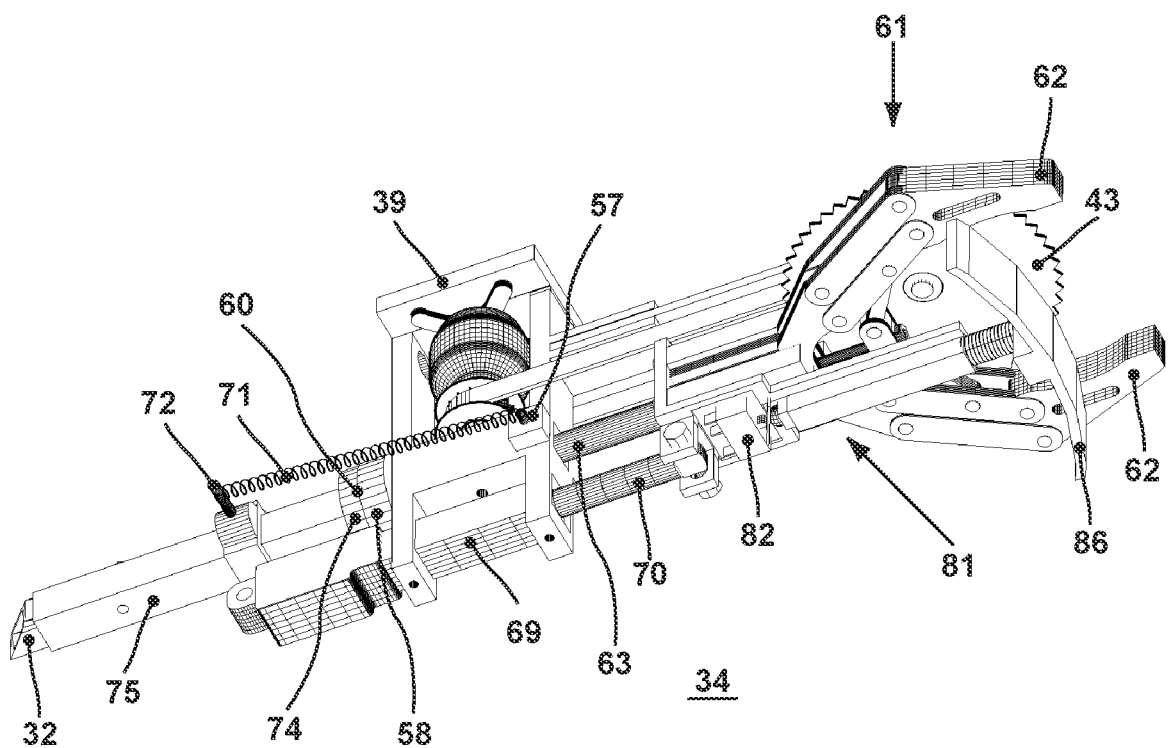
FIG. 11B also shows the weeding automaton 34, with the two jaws 62 of the gripper 61 wide open.

According to FIGS. 11A and 11B, two perspective views illustrate the position of the various components of the weeding automaton 34, from its take-off to its position 29g (see FIG. 2), just before striking the branch 80 supporting the nest 31. The bumper 86 of the contactor 81 is a few millimeters in front of the front edge of the cutting blade 43. The gripper 61 is open, with the jaws 62 spread as widely as possible above the bumper 86, which protrudes slightly on each side of the jaws 62. The electrical circuit controlled by the mini connector 82 is open. The motor of the second actuator 69 is not powered, its piston 70 in the maximum extension position to hold the gripper 61 as far forward as possible. The cutting disk 43 does not rotate, and is in a horizontal plane as are the spreader bars 72.

According to FIGS. 11A and 11B, two perspective views illustrate the position of the various components of the weeding automaton 34, from its take-off to its position 29g (see FIG. 2), just before striking the branch 80 supporting the nest 31. The bumper 86 of the switch 81 is a few millimeters in front of the front edge of the cutting blade 43. The gripper 61 is open, with the jaws 62 spread as widely as possible above the bumper 86, which protrudes slightly on each side of the jaws 62. The electrical circuit controlled by the mini connector 82 is open. The motor of the second actuator 69 is not powered, its piston 70 in the maximum extension position to hold the gripper 61 as far forward as possible. The cutting disk 43 does not rotate, and is in a horizontal plane as are the spreader bars 72.

Figure 12A:
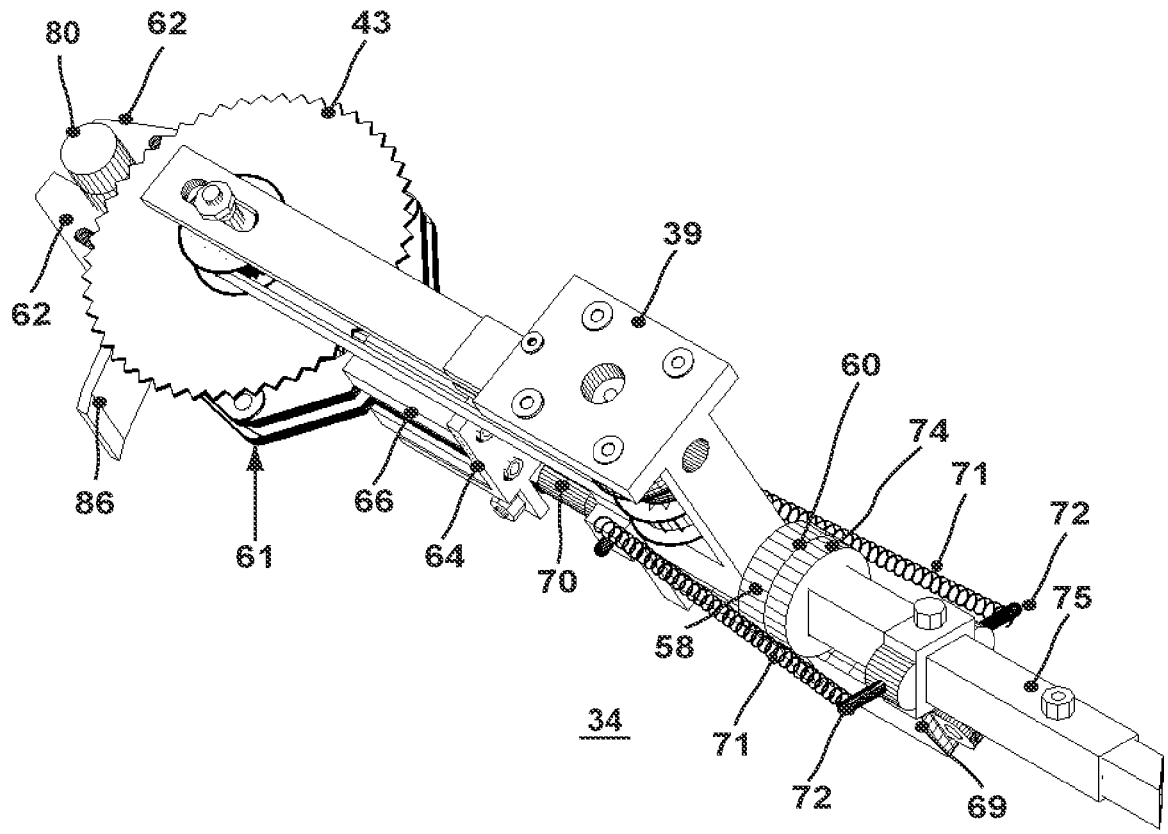
FIG. 12A shows the weeding automaton 34, with the two jaws 62 of the gripper 61 closed after pivoting.
Figure 12B:
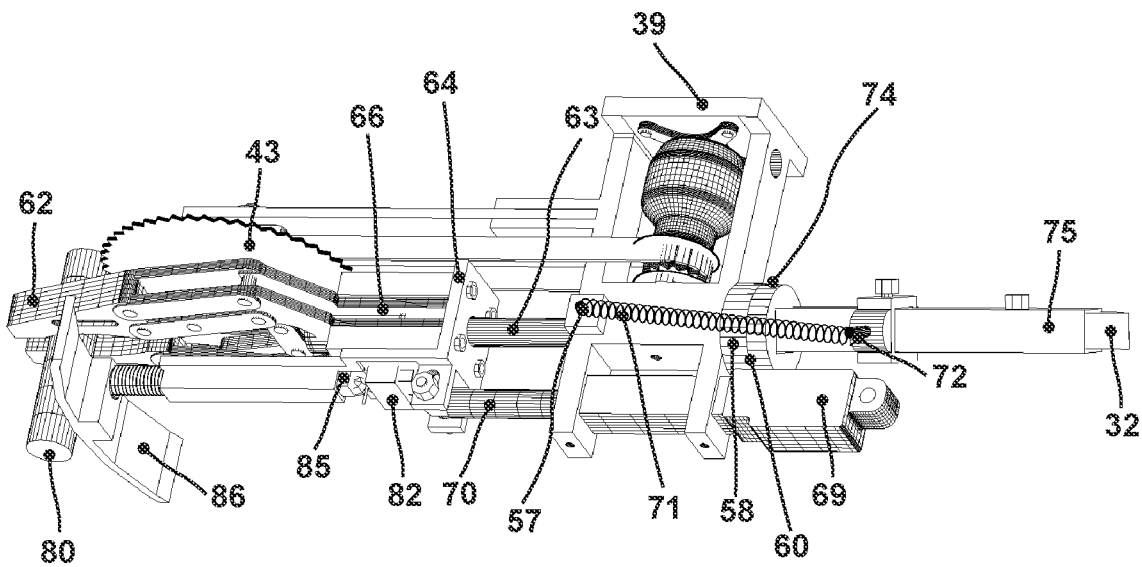
FIG. 12B also shows the weeding automaton 34, with the two jaws 62 of the gripper 61 closed after pivoting.

According to FIGS. 12A and 12B, two perspective views illustrate the position of all components of the weeding automaton 34 just after the clamp 61 is closed, with the leg 80 clamped between the two jaws 62. When the impactor 86 collided with the leg 80, the electrical circuitry of the mini connector 82 closed and initiated the software of the weeding automaton 34. The second motor 66 starts, and the gripper 61 closes within a few seconds on the branch 80 that carries the nest 31. As the two jaws 62 of the gripper 61 are tightened, the drone 27 has remained in hovering flight, the weeding automaton 34 has pivoted on the ball bearing 60, so that the plane of the two jaws 62 remains substantially perpendicular to the axis of the branch 80, thus ensuring optimum tightening. Controlled by the electronic box 35 and the software of the automaton, the maximum torque bearable by the second motor 66 of the gripper 61 is applied to the clamping of the two jaws 62. The drone 27 is now hooked to the branch 80, solidly maintained against the cutting disc 43, the front of which is plumb with the bumper 86. The branch 80 is now in the optimum position to be cut.

Figure 13A:
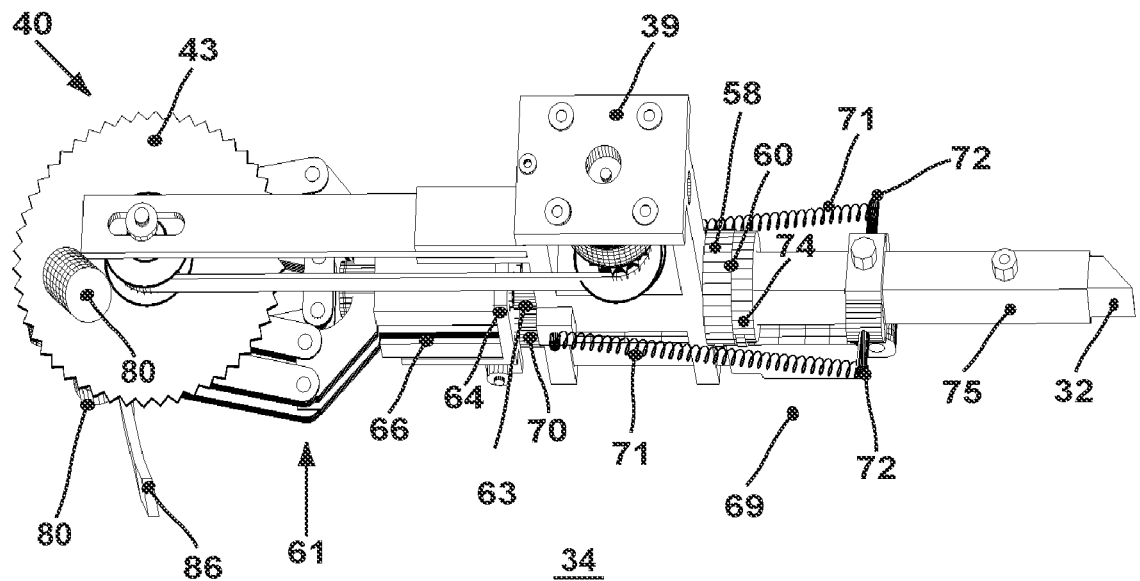
FIG. 13A shows the weeding automaton 34, with the two jaws 62 of the gripper 61 still closed on what is left of the branch 80 that has just been cut
Figure 13B:
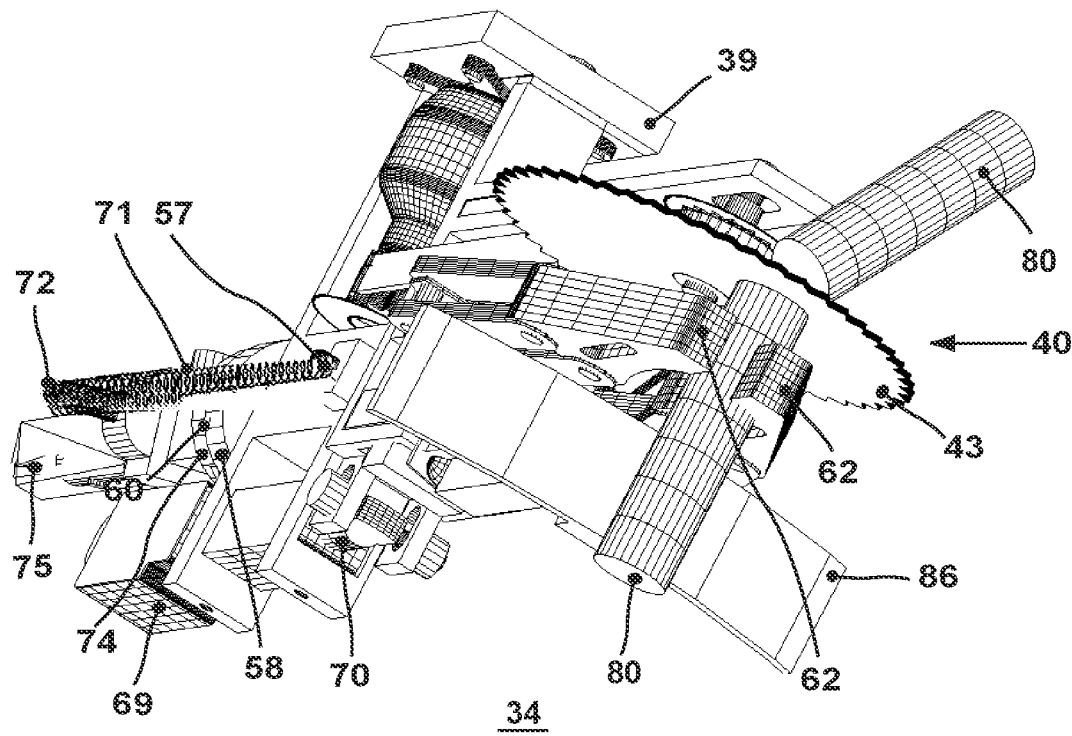
FIG. 13B shows another view of the automatic weeding automaton 34, with the two jaws 62 of the gripper 61 still closed on the rest of the branch 80 which has just been cut.

According to FIGS. 13A and 13B, two perspective views illustrate the position of all components of the weeding automaton 34 with its gripper 61 still closed on the bottom of the branch 80 that it has just cut. The circular saw 40 started automatically as soon as the two jaws 62 of the gripper 61 were clamped. The second linear actuator 69 moved the gripper 61 backward relative to the cutting disk 43 of the circular saw 40. The cutting disk 43 cut the branch 80 instead of pushing it forward, because the bumper 86 is high enough to prevent the branch 80 from tipping into the jaws 62 of the gripper 61, which also exert sufficient pressure to hold it securely by preventing it from slipping too much. The branch 80 has been cut in a few seconds and the nest 31 of pine processionary caterpillars will normally fall to the ground, without affecting the robot 29 still attached to the tree where the nest 31 that has just been eliminated was installed. The recoil of the gripper 61 of several centimeters modifies the centering of the robot 29, but this imbalance is immediately compensated by the counterweight 38 which advances in synchronism under the action of the first linear actuator 89 controlled by the electronic box 35 and the software of the automaton. If the drone 27 is equipped with motors with sufficient power reserve, and if the displacement of its center of inertia remains within the limits controllable by its autopilot, the displacement of the counterweight 38 is not necessary, and the first actuator 89 is of no use. Once the branch 80 is cut, the drone 27 is still attached to it because it has been cut above the jaws 62 of the gripper 61. When the nest 31 falls, its image, the large white spot, disappears from the view of the front camera of the drone 27 and on the screen of the tablet 23. The drone 27 starts the reverse gear, with a route free of any obstacle at the opposite course of the course 25 of departure, while remaining still attached to the branch 80. After a few seconds of delay, the first motor 42 stops, the cutting disc 43 stops turning, the jaws 62 of the gripper 61 open, the frame 39 straightens up with all the elements it supports, brought back to the vertical by the two springs 71, stretched between the two bosses 57, and the two arrow bars 72.

The piston 70 of the second linear actuator 69 moves forward, pushing the second motor 66 of the gripper 61, which returns to its starting position with the jaws 62 open. The drone 27 moves back to the vertical of its home base 24, then descends and lands, its mission completed.

Figure 14:
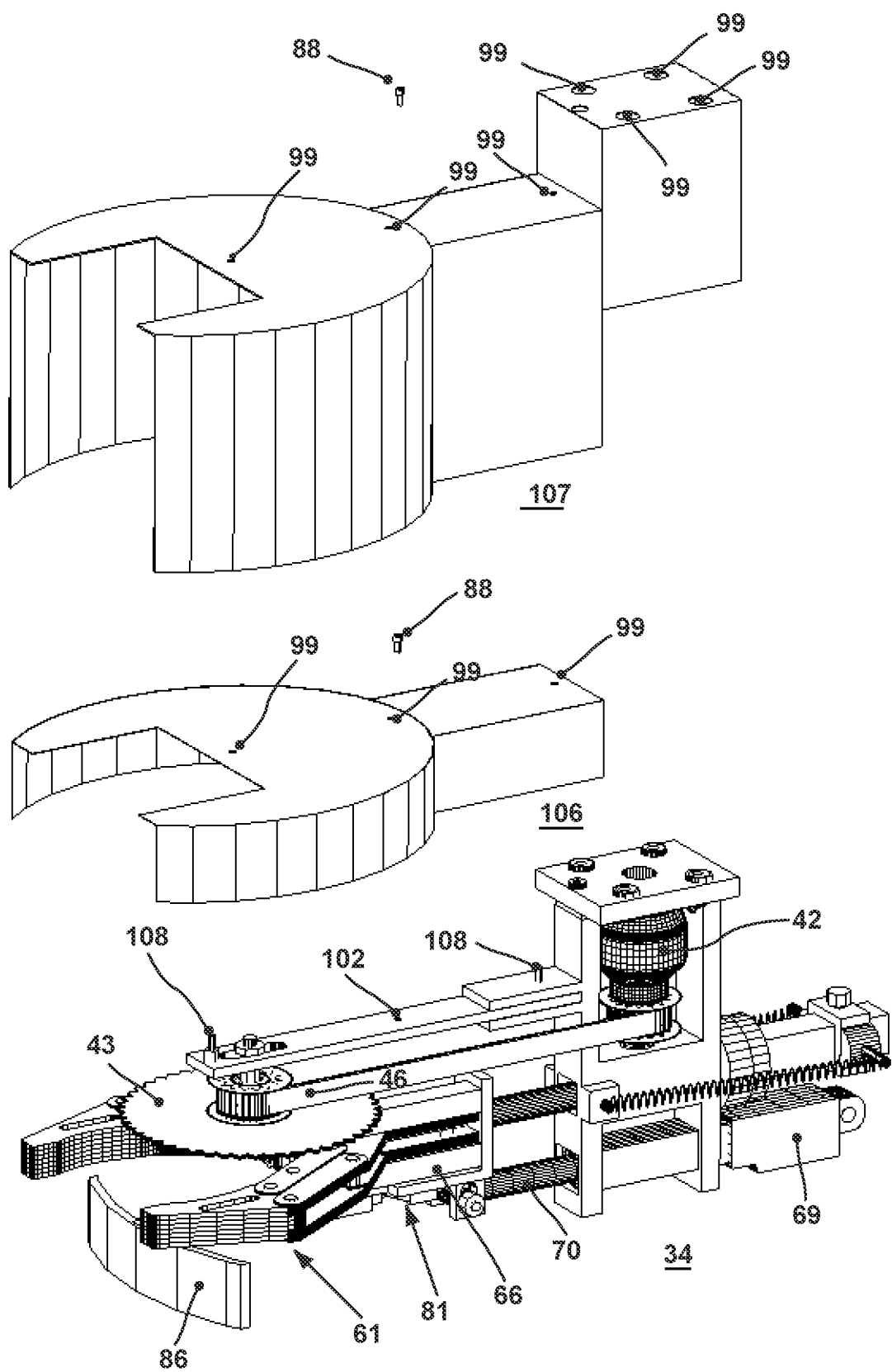
FIG. 14 is an exploded view of the weeding automaton 34, with the two jaws 62 of the gripper 61 open, and 2 possible optional protective casings 106 and 107.

According to FIG. 14, an exploded perspective view of two protective covers is shown. The first cover 107 is a complete protection of the moving parts of the weeding automaton 34: second motor 66, cutting disc 43, belt 46, contactor 81 and piston 70 of the second linear actuator 69. The second cover 106 is a lighter protection of the cutting disk 43 (dangerous for the fingers of an unwary operator 21) and of the notched belt 46. Both covers 106 and 107 are made of thin rigid plastic, preferably transparent. They are properly positioned and easily removable, with holes 99 corresponding to lugs 108 on the frame 39, The central hole 99 on the upper face of both covers 106 and 107 is tapped to receive a locking screw 88.

Figure 15:
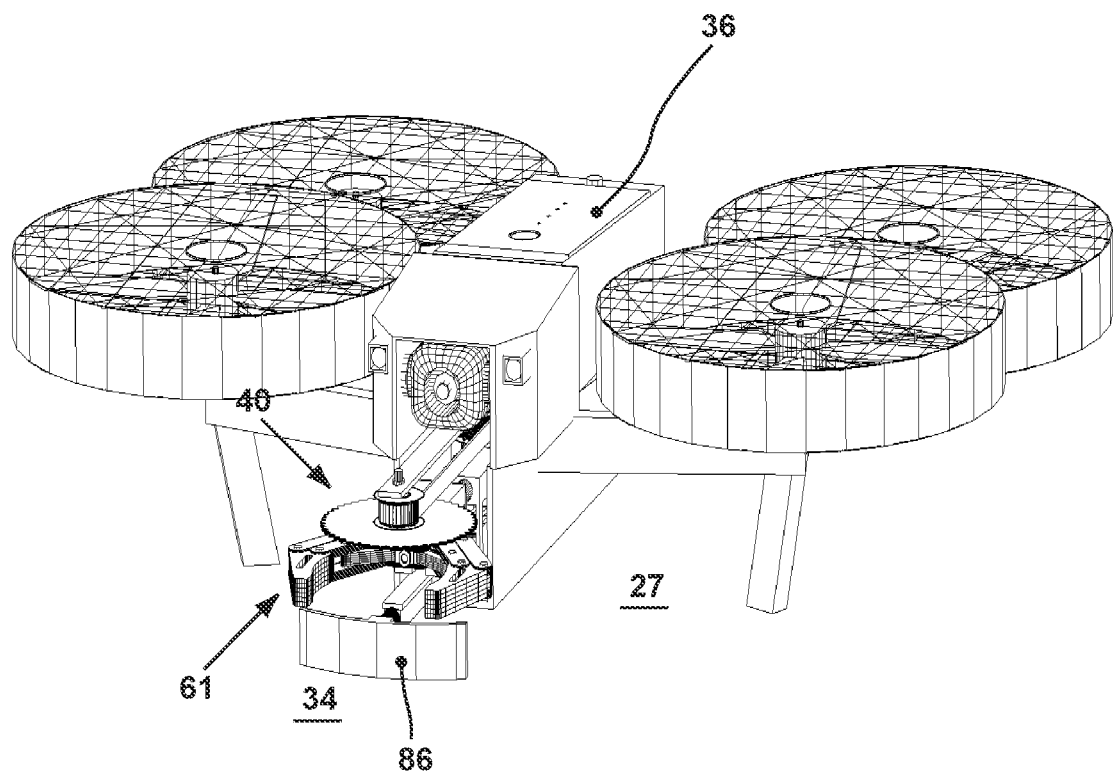
FIG. 15 is a conceptual view of a specialized drone 27, incorporating the weeding automaton 34 in its design and construction.

According to FIG. 15, a conceptual view of the robot 29 as a specialized drone 27 containing the weeding automaton 34 is shown here. The bumper 86, the gripper 61, and the circular saw 40 are included in its design and construction, but not some of the components and features found in currently available small drones. These drones carry very sophisticated and expensive equipment (very high definition camera, stabilized gimbal, etc . . . ). They have been designed for aerial photography and video, and to perform very complex missions, with distant navigation. These equipments are useless to simply find a pine processionary caterpillar nest, a big white spot on a dark background, within a maximum range of about 50 meters, approach it slowly until contact, take some pictures, then come back to the starting point . . . . In an industrial application, by keeping all the sensors, the automatic pilot software of an existing well-equipped drone, and by adding to it using its SDK (Software Development Kit) the integrated control of the weeding automaton 34, one can conceive a homogeneous unit easier to control, more compact, lighter and appreciably less expensive, which comprises only one battery positioned very backwards, and does not require either counterweight 38, or electronic box 35. It can use, with a more powerful motorization, an already existing frame, reinforced and lengthened, then especially protected with for example a solid propeller cage.

Detailed Operating Mode

MO-1 Preparation

A single person, man or woman, conducts the whole operation. This person will be referred to in this procedure as the "operator". He/she does not need to be qualified as a drone pilot.

The operator:
Checks for wind.
Visually locate the pine processionary caterpillar nest to be destroyed.
Choose a vertical plane of approach, free of any obstacle.
Prepares the drone, and if not included, mounts the weeding automaton on the drone.
Position on the ground a takeoff mat for the drone, at about 2 meters from the vertical cylinder, envelope of the tree where the nest is.
The center of the mat is in the plane of approach.
The vertical bars of the H of the mat are parallel to this plane.
Position in the center of the mat, the drone carrying its onboard automaton.
The front of the drone is oriented towards the nest, which determines its departure heading «nestHeading» maintained permanently during the whole flight.

MO-2 Start-Up of all the Devices

The operator:
Turns on the drone control console.
Turns on the tablet associated with this console.
Launches the drone control application on this tablet.
Turns on this drone.
Checks all the parameters on the console and on the tablet:
OK?
Yes: he continues the procedure;
No: he abandons the procedure.
Turns on the automaton on-board the drone.
Activates manually the on-board automaton by pressing its bumper.
The on-board automaton:
Executes "blank", on the ground, a cycle of the automatism (the whole sequence)
Closes the gripper.
Starts the circular saw motor.
Recoil of the closed gripper+advance of the centering counterweight.
Stop of the circular saw motor.
Gripper opening.
Advance of the open gripper.
Recoil of the counterweight
The components of the weeding automaton have returned to their starting position.
The LED on the on-board automaton is green:
Yes: the on-board automaton is working correctly, continue.
No: the on-board automaton is faulty, abandon the procedure.
The on-board automaton is operational. It is active and waits for a pressure on its bumper to execute a new cycle.

MO-3 Launching the Mission

The operator:
Presses button 110 (automatic mode) on tablet 23.
He becomes a simple observer, who will not intervene until the end of the mission.
The drone:
Takes off in normal mode.
Goes up 2 meters vertically, above the H of mat 17.
Stops in hover and switches to "intelligent" stabilized mode.
Activates only frontal obstacle detection.
Enables obstacle detection and avoidance in other directions.
Enables automatic target acquisition mode.

MO-4 Target Acquisition and Designation 2 options are available:
Option "A" preferred and automatically activated by default:
The search for the nest, and its designation as the target to be hit, are fully automatic,
Option "B", semi-automatic option to be used only if "A" fails:
The designation of the target is done by the operator.

MO-4A Automatic Option (Nest Designation by the Drone Software)

Operator:
Does nothing and remains a simple observer:
The minimum altitude "altiMini" from which the drone should start searching for the nest, and the maximum altitude "altiMaxi" at which the drone should give up if it has not found the nest are already in the mission parameters.
The drone:
Climbs vertically at fast speed to the minimum altitude altiMini.
Executes in loop the following algorithm described in pseudo code:
$n=0$ (n is the index of the increment)
Loop
$n=n+1$ Goes up deltaAlti cm, always vertically, staying at NestHeading Takes a photo phot(n) with its main camera facing forward.

Counts the white pixels nbPix(n) in the photo phot(n).

Memorizes its altitude alti(n) when taking the photo phot(n)

Stores the rank n1 of the first photo with white pixels

Memorizes the n2 rank of the last photo with white pixels

End of loop if n>n2" or alti(n)>altiMaxi

End of loop

Calculates the nMaxi rank of the photo containing the maximum of white pixels.

This is the rank of the best framed nest photo.

Descends by chip jumps of deltaAlti cm to the altitude A(nMaxi).

This is the approximate altitude of the nest to be eliminated.

Takes at this altitude a photo phot(nMaxi) in high definition.

Analyzes this photo by a known algorithm of the following type:

Defines a matrix initialized to 0 of all the pixels of the image phot(nMaxi)

Scans line by line all this image

Marks with a 1 in this matrix all the pixels recognized as white.

Calculates and generates the envelope rectangle of the image phot(nMaxi) of the nest.

Designates this rectangle as the target to approach.

MO-4B Semi-Automatic Option (Operator Designates Nest)

The operator:

Presses once the button 112 on the touch pad screen.

The drone:

Climbs quite slowly to vertical (20 cm/s or less).

The operator:

Watches carefully as the image scrolls vertically on the tablet.

Waits for the nest (a big white spot) to appear on this screen.

Presses a second time the button 112 on the tablet screen when the image of the nest is in the middle of this screen.

The drone:

Stops its ascent.

Hovers at the approximate altitude of the nest.

The operator:

DOES NOT USE THE JOYSTICKS of the console (disabled because too dangerous)

Presses buttons 113 to 118 to center the nest image in the middle of the tablet screen.

There is no button to control the yaw, because the heading 25 of the drone must remain the same.

Each press on one of the 6 centering buttons moves the drone a few centimeters in the chosen direction:

button 113: +5 cm in altitude
button 114: −5 cm in altitude
button 115: 5 cm forward
button 116: 5 cm backwards
button 117: 5 cm to the left keeping the heading 25
button 118: 5 cm to the right while keeping the heading 25

When the nest image is correctly centered:

The operator:

Surrounds this image with a rectangle on the touch screen, which designates it as the target to follow.

Press the button 112 a third time, which starts the automatic horizontal approach of the drone to the nest.

MO-5 Approaches the Nest, the Target Designated by a Rectangle

The drone:

Slowly advances toward the nest, maintaining heading and altitude.

Stops, and stays in hover when the bumper of the embarked automaton is at about 20 cm from the base of the nest.

Focuses his front camera on the image of the nest, the big white spot which is now in close-up on the touch pad screen.

Takes a photGrip picture with the best possible definition.

Analyze the photGrip photo to center the white spot.

Calculates the necessary adjustments to aim about 2 cm under the spot, that is to say the branch that supports the nest.

Moves step by step, in small steps of a few centimeters (Forward, Backward, Up, Down, Left, Right), to align its collimator with the calculated aiming point.

Advances very slowly during the allotted timeAll (about 10 seconds).

Collides with the branch on which the nest is hung, by the bumper of the onboard automaton.

MO-6 Control of the Hanging of the Drone to the Branch of the Nest

The drone:

Checks that it is properly attached to the branch supporting the nest.

Goes in reverse for 3 seconds.

Very slow speed,

Same altitude,

Heading=nestHeading

Measure nest distance nestDist

If nestDist=N/A (not measurable) or nestDist<=20 cm

The drone is well attached to the branch

We can continue

Otherwise

The drone is not attached to the branch

Alert message on the tablet

We do not try again to grip the branch of the nest.

We don't know why the automaton couldn't grab this branch

We don't know where exactly the drone is.

Big risk of CRASH in the surrounding branches.

Abandon the procedure and return immediately to the starting point.

Go directly to step "MO-9".

End if

If the drone's software is sophisticated enough, there are other ways for it to know if its on-board automaton was able to grab the targeted branch or not.

The important thing is that the drone makes sure, whatever the method used, and that it reacts accordingly,

MO-7 Section of the Branch Supporting the Nest

The on-board automaton:

Closes its gripper (clamp 61) very quickly.

The advance of the drone towards the nest is now blocked in spite of the maintenance of a weak thrust of its motors.

The branch on which the nest is installed being rarely vertical, the gripper can pivot during its closing about its horizontal axis, the carrying pole, so that the plane of its jaws remains substantially perpendicular to the axis of this branch.

The cutting disc of the circular saw is then correctly positioned with respect to the nest's supporting branch, in an optimal position to be cut a few millimeters above the closed gripper.

The drone:
Remains gripped to the branch in a flexible way by the end of its pole,
with constant altitude and heading, in quasi-stationary flight in spite of the maintenance of a weak thrust of its engines towards the front.

The onboard automaton:
Activates the motors of its linear actuators 69 and 89.
The gripper 61 moves backwards from the cutting disc 43.
The counterweight 38 advances to balance the centering.
The branch is cut a few millimeters above the gripper
Reverses the direction of rotation of the motors of actuators 69 and 89.
The gripper 61 advances relative to the cutting disk 43.
The counterweight 38 moves back synchronously to balance the centering.

The drone:
Waits for the expiration of the allocated allTime (about 10 seconds).

If everything worked well, the nest falls from the tree, and leaves the camera field.

MO-8 Result Check

The drone:
Remains attached to the uncut part of the branch, because the gripper is under the cutting disk of the circular saw.
Is not destabilized when the nest falls.
Takes a photo with his front camera.
Analyzes the recorded image.
Has the nest disappeared from the image?
  Yes: All went well
  No: The mission failed,
The automaton did not manage to cut the branch it was holding on to.
We can try again, but starting from scratch after repositioning the drone to approach the nest from a different angle.

MO-9 Automatic Gripper Release

Regardless of the mission outcome, the gripper 61 is still closed.
The drone:
Switches to reverse at very slow speed.
Opens the gripper.
Corrects its course if it has moved a little bit from nestHeading
Back up about 1 m, at very slow speed to get away from the branches.

MO-10 Return to Home Base

The drone:
Backs up at normal speed to the vertical of the takeoff mat, following the reverse path of the outward track, a safe route free of any obstacles, the pole always remaining oriented on the starting heading nestHeading.
Descends rapidly over the H of the mat.
Automatically lands on the mat.

MO-11 End of Mission

Operator:
Turns off all devices.
Carefully cleans the gripper and the cutting disc of the saw.
Checks that the nest has fallen to the ground and has not been caught in low branches.
If not, drop it with a long pole. Carefully retrieves the fallen nest and places it in a bag for burning it.

The invention claimed is:

1. A weeding robot comprising:
a flying drone, the flying drone comprising an on-board automaton;
an articulated gripper arranged to grip the flying drone with a branch supporting a nest to be eliminated,
a cutting device mounted on the flying drone, the cutting device being configured to cut a branch supporting a nest to be eliminated, and
a drone's inertia control unit, wherein
the on-board automaton is equipped with a horizontal support pole carrying the cutting device,
centering of the weeding robot is adjusted by the drone's inertia control unit aided by a counterweight including a battery for powering the robot, and
the articulated gripper comprises a motorized articulated gripper which moves along the horizontal support pole under an action of a first linear actuator controlled by a microprocessor of the on-board automaton, and a second linear actuator arranged to synchronously move said counterweight along the horizontal support pole, to adjust centering of the weeding robot during the movements of the articulated gripper.

2. The weeding robot according to claim 1, wherein the cutting device comprises a circular saw rotated by a first electric motor, the circular saw including a rotating cutting disc projecting forwardly with respect to the first motor.

3. The weeding robot according to claim 2, wherein the articulated gripper is arranged under the cutting device, the articulated gripper being actuated by a second electric motor driving two jaws of the motorized articulated gripper between a closed position and an open position.

4. The weeding robot according to claim 3, wherein the second electric motor of the articulated gripper comprises a transmission system cooperating with two links configured to move the two jaws towards and away from each other, respectively in a closed position and in an open position.

5. The weeding robot according to claim 3, wherein the on-board automaton is controlled by an electronic box containing a microprocessor configured to control the first and second motors as well as the first and second actuators.

6. A method for locating and destroying a nest of pine processionary caterpillars on an infested tree, using a weeding robot according to claim 1, comprising the following successive steps:
locating by an operator on an infested tree a nest of caterpillars to be removed,
choosing a vertical plane of approach by the operator,
placing the weeding robot on a mat placed in front of the infested tree, and orient the weeding robot in the vertical plane of approach heading of the nest by the operator, the weeding robot being fixed to the flying drone, launching from a tablet a standard pre-programmed mission for the flying drone after powering up various components of the weeding robot by an operator, monitoring by an operator on a screen of the tablet images of a front camera of the flying drone, information on a progress of the standard pre-programmed mission, automatically executing the standard mission pre-programmed in a navigation software of the flying drone, using data from sensors of the flying drone and the front camera, with display on the tablet, detecting a white spot representative of the nest with the front camera, save an altitude of the nest and designate the nest as a target to reach, advancing the flying drone horizontally towards the target until a bumper of a mechanical contactor of the flying drone comes against a branch supporting the nest, which pauses its navigation mission and activates the weeding automaton, executing a program of a processor of the weeding automaton, closing the articulated gripper to grip and tighten the branch, followed by starting a circular saw of the flying drone to cut the branch, causing the nest to fall, and disappearance of the nest from a field of vision of the front camera and from the screen of the tablet, and resuming the navigation mission so as to land the flying drone.

7. A weeding robot comprising:

a flying drone, the flying drone comprising an on-board automaton;

an articulated gripper arranged to grip the flying drone with a branch supporting a nest to be eliminated, a cutting device mounted on the flying drone, the cutting device being configured to cut a branch supporting a nest to be eliminated, a drone's inertia control unit, wherein the on-board automaton is equipped with a horizontal support pole carrying the cutting device, centering of the weeding robot is adjusted by the drone's inertia control unit aided by a counterweight including a battery for powering the robot, the cutting device comprises a circular saw rotated by a first electric motor, the circular saw including a rotating cutting disc projecting forwardly with respect to the first motor, the articulated gripper is arranged under the cutting device, the articulated gripper being actuated by a second electric motor driving two jaws of the motorized articulated gripper between a closed position and an open position, and the articulated gripper is supported by a first cylindrical tube configured to slide in a second tube of a frame to guide the articulated gripper forwards or backwards under an action of a control mechanism of the first actuator, the frame being mounted so that the frame can pivot about an axis of the pole on a ball bearing.

8. The weeding robot according to claim 7, wherein the control mechanism of the first linear actuator comprises a switch provided with a bumper cooperating with a pusher coming into engagement with a connector for starting the on-board automaton and closing the articulated gripper as soon as the bumper strikes the branch supporting the nest.

* * * * *